(12) United States Patent
Salti et al.

(10) Patent No.: US 11,210,939 B2
(45) Date of Patent: Dec. 28, 2021

(54) SYSTEM AND METHOD FOR DETERMINING A VEHICLE CLASSIFICATION FROM GPS TRACKS

(71) Applicant: Verizon Connect Development Limited, Sandyford Dublin (IE)

(72) Inventors: Samuele Salti, Prato (IT); Francesco Sambo, Padua (IT); Leonardo Taccari, Florence (IT); Luca Bravi, Scandicci (IT); Matteo Simoncini, Pistoia (IT); Alessandro Lori, Florence (IT)

(73) Assignee: Verizon Connect Development Limited, Dublin (IE)

( * ) Notice: Subject to any disclaimer, the term of this patent is extended or adjusted under 35 U.S.C. 154(b) by 0 days.

(21) Appl. No.: 15/518,694

(22) PCT Filed: Dec. 2, 2016

(86) PCT No.: PCT/EP2016/079625
§ 371 (c)(1),
(2) Date: Apr. 12, 2017

(87) PCT Pub. No.: WO2018/099574
PCT Pub. Date: Jun. 7, 2018

(65) Prior Publication Data
US 2019/0287388 A1 Sep. 19, 2019

(51) Int. Cl.
*G08G 1/015* (2006.01)
*G01S 19/42* (2010.01)
(Continued)

(52) U.S. Cl.
CPC .............. *G08G 1/015* (2013.01); *G01S 19/42* (2013.01); *G01S 19/52* (2013.01); *G06K 9/6269* (2013.01); *G07C 5/008* (2013.01)

(58) Field of Classification Search
CPC .......... G08G 1/015; G01S 19/42; G01S 19/52; G07C 5/008
See application file for complete search history.

(56) References Cited

U.S. PATENT DOCUMENTS 8,015,144 B2 * 9/2011 Zheng .................... G01C 21/20
706/52
9,053,632 B2 * 6/2015 Shen .................... G08G 1/0129
(Continued)

FOREIGN PATENT DOCUMENTS

WO 2016/145547 9/2016

OTHER PUBLICATIONS

Sun, Vehicle classification using GPS data (Year: 2013).*
(Continued)

*Primary Examiner* — Li B. Zhen
*Assistant Examiner* — Tewodros E Mengistu

(57) ABSTRACT

A method and system for classifying a vehicle based on low frequency GPS tracks. The method and system comprise retrieving a low frequency GPS track having a sampling interval of at least 20 seconds; deriving additional data from the low frequency GPS track, the additional data including interval speed and instantaneous acceleration of the vehicle; extracting a plurality of data sets from the low frequency GPS track and the additional data; generating a plurality of features from the extracted data sets; and providing the plurality of generated features to a classifier that classifies the vehicle into a predetermined class.

20 Claims, 13 Drawing Sheets

(51) Int. Cl.
G01S 19/52 (2010.01)
G07C 5/00 (2006.01)
G06K 9/62 (2006.01)

(56) References Cited

U.S. PATENT DOCUMENTS

| | | | |
|---|---|---|---|
| 9,846,977 B1 | 12/2017 | Cox et al. | |
| 2002/0128751 A1 | 9/2002 | Engstrom et al. | |
| 2002/0159642 A1* | 10/2002 | Whitney | G06K 9/6228 382/225 |
| 2009/0157584 A1* | 6/2009 | Yang | G06K 9/6231 706/46 |
| 2012/0095944 A1* | 4/2012 | Krupka | G06N 20/00 706/12 |
| 2015/0266455 A1 | 9/2015 | Wilson | |
| 2017/0163616 A1 | 6/2017 | Smith et al. | |
| 2017/0270406 A1 | 9/2017 | Visser et al. | |
| 2017/0355370 A1 | 12/2017 | Tsumori | |
| 2018/0047288 A1 | 2/2018 | Cordell et al. | |
| 2018/0120843 A1 | 5/2018 | Berntorp et al. | |
| 2018/0154899 A1 | 6/2018 | Tiwari et al. | |

OTHER PUBLICATIONS

Byon, Real-Time Transportation Mode Detection via Tracking Global Positioning System Mobile Devices (Year: 2009).*
Guyon, Gene Selection for Cancer Classification using Support Vector Machines (Year: 2002).*
"Open Street Map", http://www.openstreetmap.org/, 1 page, downloaded May 15, 2017.
"PTV Group", http://xserver.ptvgroup.com/, 7 pages, downloaded May 15, 2017.
"Recurrent neural network", Wikipedia, "Recurrent neural network," https://en.wikipedia.org/wiki/Recurrent_neural_network, May 13, 2017, 12 pages.
"Roadside Assistance", Verizon, https://www.verizonwireless.com/connected-devices/hum-by-verizon/, 10 pages, downloaded May 15, 2017.
Abadi, et al., "TensorFlow: Large-scale machine learning on heterogeneous systems", http://tensorflow.org/, 2015, 4 pages.
Bolbol, et al., "Inferring hybrid transportation modes from sparse GPS data using a moving window SVM classification", Computers, Environment and Urban Systems special Issue: Advances in Geocomputation, 2012, 12 paqes.
Brodersen, et al., "The balanced accuracy and its posterior distribution", In: Pattern recognition (ICPR), 2010 20th international conference on. IEEE, 2010, 4 pages.
Chollet, "https://github.com/fchollet/keras", https://github.com/fchollet/keras, 4 pages, downloaded May 16, 2017.
Dong, et al., "Characterizing driving styles with deep learning", http://arxiv.org/abs/1607.03611, 2016, 10 pages.
Gebru, et al., "Using Deep Learning and Google Street View to Estimate the Demographic Makeup of the US", http://arxiv.org/abs/1702.06683, 2017, 41 pages.
Gers, et al., "Learning to forget: Continual prediction with LSTM", Neural computation, 2000, 19 pages.
Glorot, et al., "Understanding the difficulty of training deep feedforward neural networks", JMLR W&CP: Proceedings of the Thirteenth International Conference on Artificial Intelligence and Statistics (AISTATS 2010), May 2010, 8 pages.
Gonzales, et al., "Automating mode detection using neural networks and assisted GPS data collected using GPS-enabled mobile phones", In: 15th World congress on intelligent transportation systems, 2008, 12 pages.
Gupte, et al., "Detection and classification of vehicles", IEEE Transactions on intelligent transportation systems, 2002, 27 pages.
Guyon, et al., "An introduction to variable and feature selection", Journal of machine learning research, 2003, 26 paqes.
Hallenbeck, et al., "Verification, refinement, and applicability of long-term pavement performance vehicle classification rules", Tech. rep., 2014, 162 pages.
Hochreiter, et al., "Long short-term memory", Neural computation, 1997, 32 pages.
Ioffe, et al., "Batch normalization: Accelerating deep network training by reducing internal covariate shift", http://arxiv.org/abs/1502.03167, 2015, 11 pages.
Kingma, et al., "Adam: A method for stochastic optimization", http://arxiv.org/abs/1412.6980, 2015, 15 pages.
Le, et al., "A simple way to initialize recurrent networks of rectified linear units", arXiv preprint, http://arxiv.org/abs/1504.00941, 2015, 9 pages.
Lecun, et al., "Deep Learning", https://www.cs.toronto.edu/~hinton/absps/NatureDeepReview.pdf, May 28, 2015, 9 pages.
Leduc, "Road traffic data: Collection methods and applications", Working Papers on Energy, Transport and Climate Change (1), 2008, 55 pages.
Nair, et al., "Rectified linear units improve restricted boltzmann machines", 27th International Conference on Machine Learning (ICML-10). Omnipress, 2010, 8 pages.
Pascanu, et al., "On the difficulty of training recurrent neural networks", ICML, 2013, 9 pages.
Saxe, et al., "Exact solutions to the nonlinear dynamics of learning in deep linear neural networks", http://arxiv.org/abs/1312.6120, 2013, 22 pages.
Simoncini, et al., "Vehicle classification from low frequency GPS data", IEEE 16th International Conference on Data Mining Workshops (ICDMW), 2016, 8 pages.
Song, et al., "Deeptransport: Prediction and simulation of human mobility and transportation mode at a citywide level", In: Proceedings of the Twenty-Fifth International Joint Conference on Artificial Intelligence, IJCAI 2016, New York, NY, USA, Jul. 9-15, 2016, 7 pages.
Sun, et al., "Vehicle classification using GPS data", Transportation Research Part C: Emerging Technologies. 2013, 16 paqes.
Wyman, et al., "Field evaluation of FHWA vehicle classification categories", Maine Department of Transportation, Bureau of Highways, Materials and Research Division, Jan. 1985, 18 pages.
Xiao, et al., "Travel mode detection based on GPS track data and Bayesian networks", Computers, Environment and Urban Systems, 2015, 15 pages.
Yang, "An evaluation of statistical approaches to text categorization", 1999. Information retrieval 1 (1-2), 69-90.
Zheng, "Learning transportation mode from raw GPS data for geographic applications on the web", In: Proceedings of the 17th international conference on World Wide Web. ACM, 2008, 10 pages.
Zhou, et al., "Image-based vehicle analysis using deep neural network: A systematic study", http://arxiv.org/abs/1601.01145, 2016, 5 pages.
Bolbol, et al., "Inferring hybrid transportation modes from sparse GPS data using a moving window SVM classification", Computers, Environment and Urban Systems Elsevier Science Ltd. UK, vol. 36, No. 6, Nov. 2012, p.p. 526-537.
Xing, et al., "Online Travel Mode Identification Using Smartphones With Battery Saving Considerations", IEEE Transactions On Intelligent Transportation Systems, IEEE, Piscataway, NJ, USA, vol. 17, No. 10, Oct. 1, 2016, p.p. 2921-2934.
Zhanbo, et al., "Vehicle classification using GPS data", Transportation Research. Part C, Emerging Technologies, vol. 37, Dec. 2013, p.p. 102-117.
Godbout, "Recurrent Neural Networks for Beginners", Aug. 12, 2016, Medium, Retrieved from https://medium.com/@camrongodbout/recurrent-neural-networks-for-beginners-7aca4e933b82 (Year: 2016).
Hastie, et al., "The Elements of Statistical Learning", Feb. 2009, Springer, Chapter 11 (pp. 389-416) (Year: 2009).
Hussain, et al., "On-road vehicle classification based on random neural network and bag-of-visual words", 2016, Probability in the Engineering and Informational Sciences (Year: 2016).
Rosenblatt et al., "The Perceptron—A Perceiving and Recognizing Automaton", Cornell Aeronautical Laboratory, Inc., 1957, 33 pages.
Breiman, "Random Forests", Machine Learning, 45, pp. 5-32, 2001.

(56) References Cited

OTHER PUBLICATIONS

Cortes et al. "Support-Vector Networks", Machine Learning, 20, pp. 273-297 (1995).
Guyon et al., "Gene Selection for Cancer Classification using Support Vector Machines", Machine Learning, 46, pp. 389-422 (2002).
Kira et al., "A Practical Approach to Feature Selection", 1992, 8 pages.
Benoit et al., "Feature selection for nonlinear models with extreme learning machines", Jan. 2012, pp. 111-124.
Zaffalon et al., "Robust Feature Selection by Mutual Information Distributions", 2002, 8 pages.
Bi et al, "Dimensionality Reduction via Sparse Support Vector Machines", Journal of Machine Learning Research 3 (2003) pp. 1229-1243.
Seth et al., "Variable selection: A statistical dependence perspective", 2010 Ninth International Conference on Machine Learning and Applications (2010), pp. 931-936.
Breiman et al., "Classification and Regression Trees", CRC Press, New York, (1999) 358 pages.

\* cited by examiner

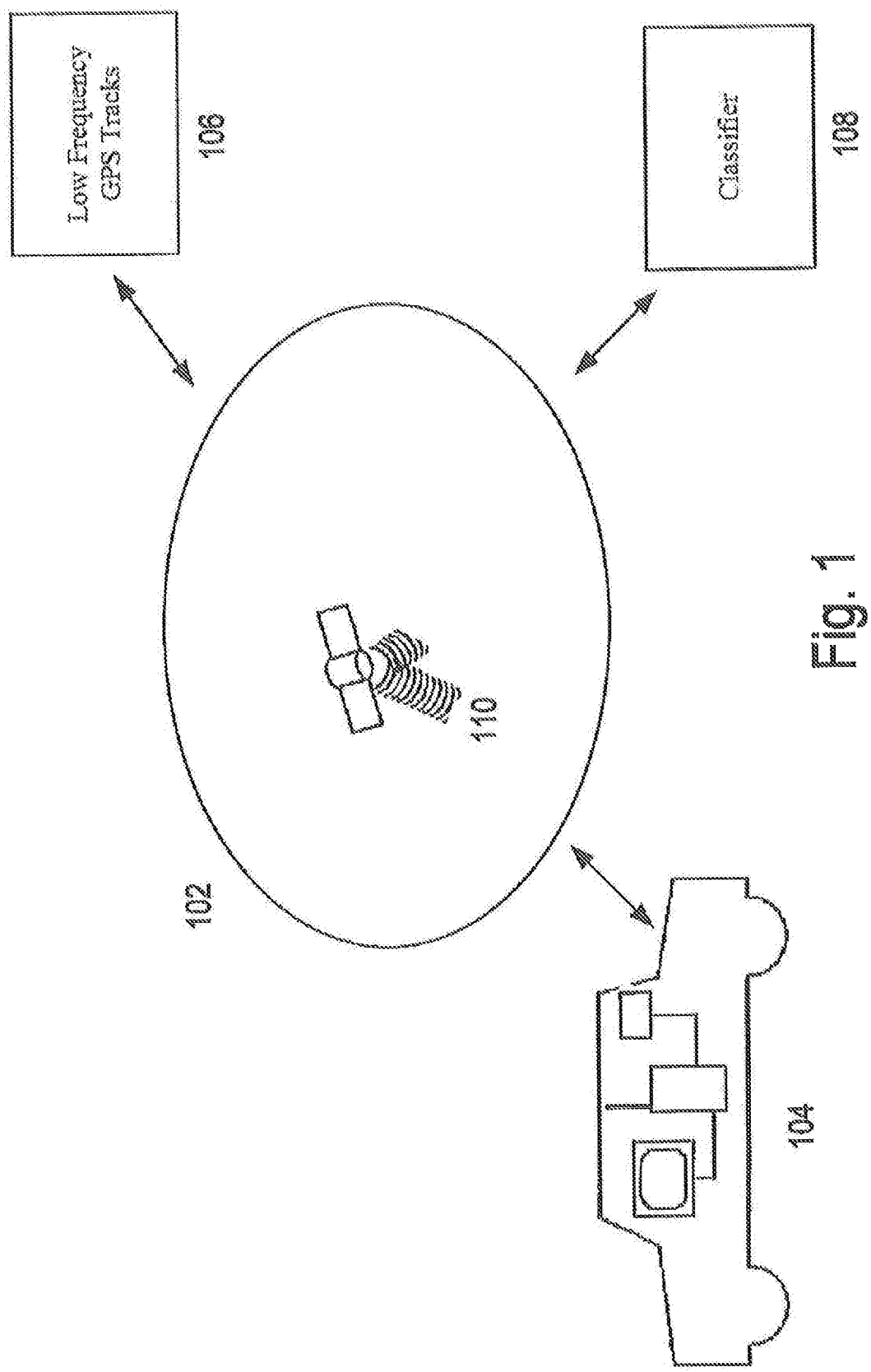

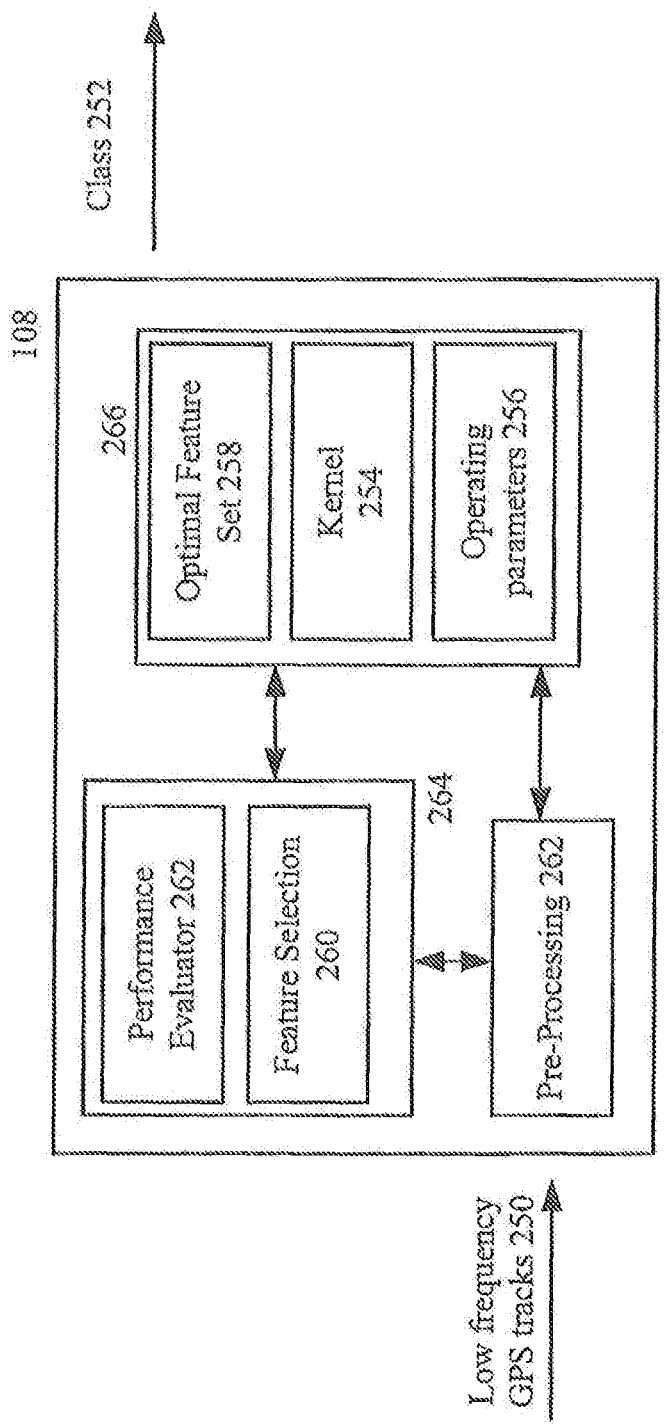

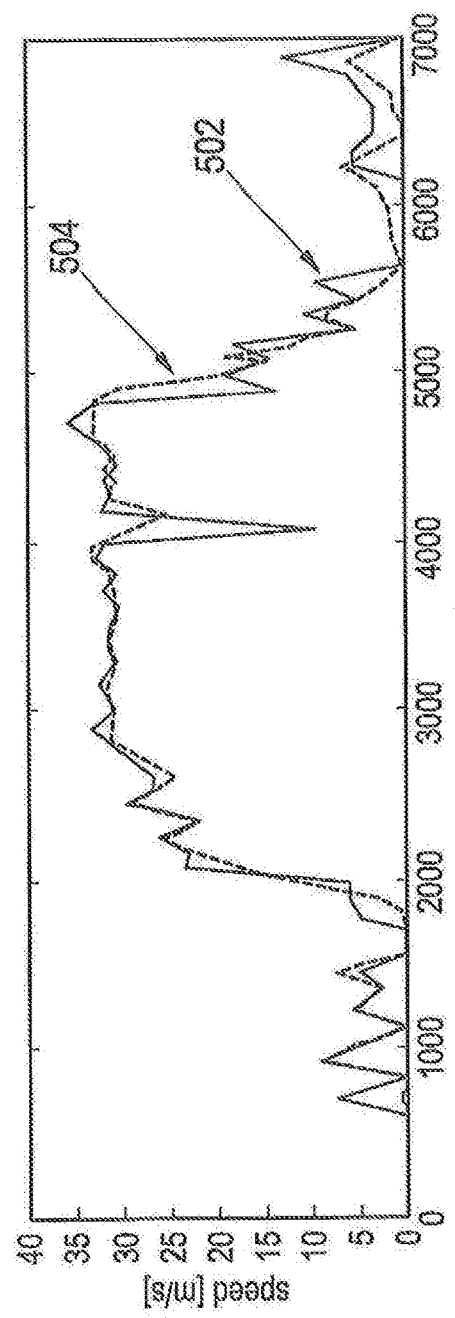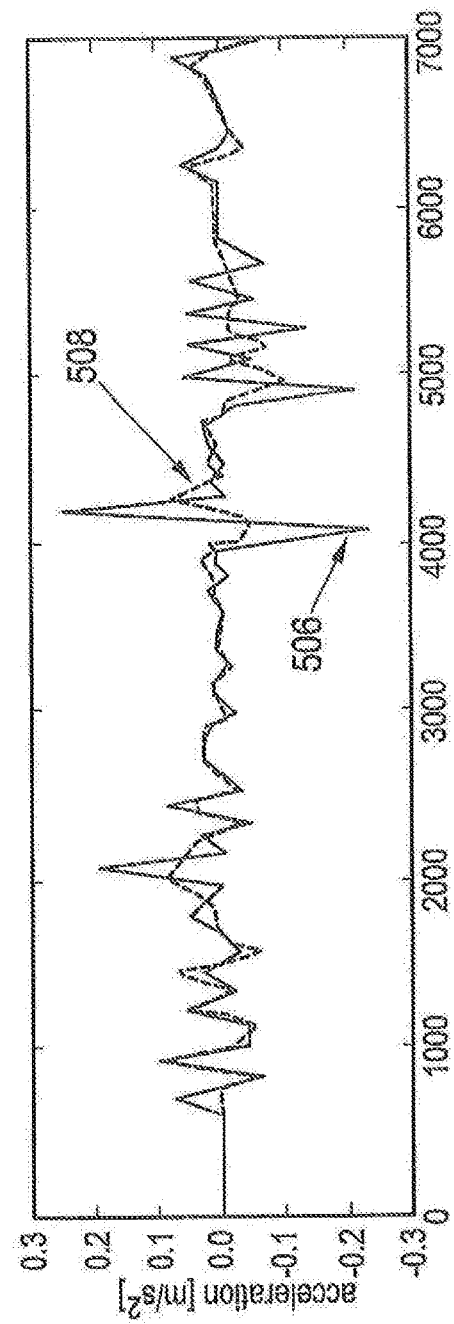

| | $\{v_i\}_{i=1}^n$ | $\{v_i\}_{i=1}^n$ | $\{a_i\}_{i=1}^n$ | $\{a_i\}_{i=1}^n$ | $\{a_{>0}\}$ | $\{a_{<0}\}$ | $\{v_{>0}\}$ | $\{v_{>0}\}$ |
|---|---|---|---|---|---|---|---|---|
| mean | 19 | 47 | | | | | 20 | 36 |
| std | 13 | 26 | 68 | | | | 5 | 27 |
| median | 62 | 50 | | | | | 49 | 39 |
| mad | | | | 30 | | | | |
| iqr | | 53 | | 15 | 54 | 66 | 58 | 23 |
| 75th | 67 | 51 | | | 55 | 69 | 46 | 35 |
| 90th | 45 | 29 | 55 | | | 58 | | 43 |
| 95th | 28 | 31 | 33 | 11 | 18 | | 8 | 16 |
| hist1 | 32 | 21 | 60 | | | 63 | 12 | 9 |
| hist2 | 22 | 57 | | | | | 25 | 14 |
| hist3 | | | | | 48 | | 38 | 40 |
| hist4 | 24 | | | | 34 | | | 41 |
| hist5 | 44 | | | 65 | 17 | | 37 | 52 |

Fig. 8a

| Road type percentage | | | | | | Total distance |
|---|---|---|---|---|---|---|
| motorway | highway | trunk road | country road | city road | residential road | |
| 3 | 7 | 10 | 6 | 4 | 2 | 1 |

Fig. 8b

SYSTEM AND METHOD FOR DETERMINING A VEHICLE CLASSIFICATION FROM GPS TRACKS

RELATED APPLICATION

This application claims priority to PCT Application No. PCT/EP2016/079625, filed Dec. 2, 2016, which is incorporated herein by reference.

FIELD OF THE INVENTION

The present application generally relates to a system and method for determining a vehicle classification from GPS tracks. More specifically, the system and method are capable of utilizing a machine learning algorithm to determine a class of a vehicle based on low frequency GPS tracks.

BACKGROUND

To infer the type of vehicles in a road network is a known problem typically referred to in the literature as vehicle classification and is a fundamental task in several applications, such as, surveillance systems, traffic management, emission control and estimation of highway lifespan. The Federal HighWay Administration ("FHWA") of the United States proposed a 13-category vehicle taxonomy, the classification of which is based on the vehicle weight, length, number of axles, and axles distances. Even if the rules have been revised over the years by companies and agencies, the FHWA 13 vehicle categories are still used as a classification reference.

Methods to address the vehicle classification problem employ both hardware and software solutions in different contexts. When physical components can be installed along a road, hardware-based techniques using fixed-location sensors can be adopted. Such approaches can provide the full 13-class classification in exchange for a high installation cost. On the other hand, most software-based techniques perform classification from images or videos, obtained, for instance, from surveillance cameras. The classification targets can vary, depending on the resolution of the cameras. For example, some application may only be able to classify vans, taxis and passenger cars or may only be able to classify sedans, pickups and vans.

In the last decade, the great diffusion of GPS (Global Positioning System) devices is generating a growing interest in the application of data mining techniques to the huge amount of spatio-temporal data produced by such devices. GPS data are typically produced by either general-purpose mobile devices (e.g., smartphones) or dedicated GPS tracker devices, usually installed on commercial or public transport vehicles (e.g., delivery fleets, taxis, ambulances). In the former case, GPS signals are used for navigation or geolocalisation purposes, hence with high sampling rates (of the order of one GPS sample per second). In the latter case, GPS signals are typically used for remote vehicle tracking or anti-theft systems and lower frequency sampling (of the order of one sample per minute) is sufficient. The use of low frequency GPS data allows for the reduction of operational costs due to bandwidth, storage space and computational power and is therefore very common in industrial applications and commercial fleet management solutions. Clearly, the technical and economic advantages come at the cost of accuracy: lower frequency sampling means that information on instantaneous speeds and accelerations are scarce or not available at all and that it is harder to infer the true path of a vehicle between two reported positions.

The ubiquity of GPS devices motivates the use of methods that leverage GPS data to perform vehicle classification. Relying exclusively on GPS-based features makes a complete 13-category classification very challenging, due to the difficulty to have a clear measure of axles number and distances. However, as previously reported, in many real traffic applications, such as travel pattern or quality of traffic flow estimation, it is often sufficient to be able to distinguish between two or three classes of vehicles.

Previous work that used GPS data to classify a vehicle was reported in Z. Sun ("Sun"), "Vehicle classification using GPS data," Transportation Research Part C: Emerging Technologies, Vol. 37, pp. 102-117, No. 12, 2013, the entirety of which is incorporated herein by reference. Sun only explores vehicle classification from relatively high frequency GPS data, which is about 1 data point in every three seconds, and considers a two-class classification problem, distinguishing between passenger cars and delivery trucks. The reported results are obtained from a small size dataset comprising 52 tracks of passenger cars and 84 tracks of trucks. GPS data used in that work has a sampling rate of 3 seconds, which is relatively high. Sun concluded that speed-related features greatly depend on traffic conditions, whereas acceleration- and deceleration based features have a more consistent predictive power.

SUMMARY OF THE INVENTION

As low frequency GPS data are often used in commercial fleet management, it is desirable to classify a vehicle based on low frequency GPS data. One challenge in using the low frequency GPS data is that they do not reflect comprehensive and real time information of the path traveled by a vehicle and the operating conditions of the vehicle. The method and system of the present application overcome this challenge by using a machine learning algorithm to classify a vehicle based on a large number of features that are generated from expanded low frequency GPS tracks. An expanded low frequency GPS track includes additional data derived from the raw low frequency GPS track.

An aspect of the present application is directed to a method for classifying a vehicle based on low frequency GPS tracks. The method comprises retrieving a low frequency GPS track having a sampling interval of at least 20 seconds; deriving additional data from the low frequency GPS track, the additional data including interval speed and acceleration estimations of the vehicle; extracting a plurality of data sets from the low frequency GPS track and the additional data; generating a plurality of features from the extracted data sets; and providing the plurality of generated features to a classifier that classifies the vehicle into a predetermined class.

According to various embodiments of the present application, the step of generating the plurality of features includes aggregating the plurality of extracted data sets by statistical functions. The method further comprises providing a plurality of empirical features to the classifier. The method further comprises selecting an optimal feature set of features from the plurality of generated features and the plurality of empirical features; and providing the optimal feature set to the classifier. The step of selecting an optimal feature set includes ranking features with a recursive feature elimination algorithm.

According to various embodiments of the present application, the additional data further include interval acceleration of the vehicle. The extracted data sets include a sequence of instantaneous speed, a sequence of interval speed, a sequence of instantaneous acceleration, and a sequence of interval acceleration. The plurality of empirical features include a total distance of the low frequency GPS track and road types of routes covered by the low frequency GPS track. The classifier includes a support vector machine having a radial basis function kernel.

According to another embodiment, the method further comprises collecting a plurality of training samples that have low frequency GPS tracks of vehicles with a known class; and determining operating parameters of the SVM classifier with radial basis function kernel based on the training samples. The method further comprises aggregating classification results of a plurality of low frequency GPS tracks.

According to another aspect, the present application is directed to a non-transitory storage medium storing an executable program that, when executed, causes a processor to implement the vehicle classifying method as disclosed in the present application.

BRIEF DESCRIPTION OF THE DRAWINGS

The accompanying drawings are provided to illustrate embodiments of this disclosure, and, together with the detailed description, serve to explain principles of embodiments as set forth in the present application, in which:

FIG. 1 illustrates a system for classifying vehicles according to an embodiment of the present application.

FIG. 2b illustrates functional blocks of a classifier for classifying a vehicle according to an embodiment of the present application.

FIG. 5a illustrates speed profiles of a vehicle according to an embodiment of the present application.

FIG. 5b illustrates acceleration profiles of a vehicle according to an embodiment of the present application.

FIG. 8a illustrates ranks of aggregated features according to an embodiment of the present application.

FIG. 8b illustrates ranks of empirical features according to an embodiment of the present application.

DETAILED DESCRIPTION

Figure 2A:
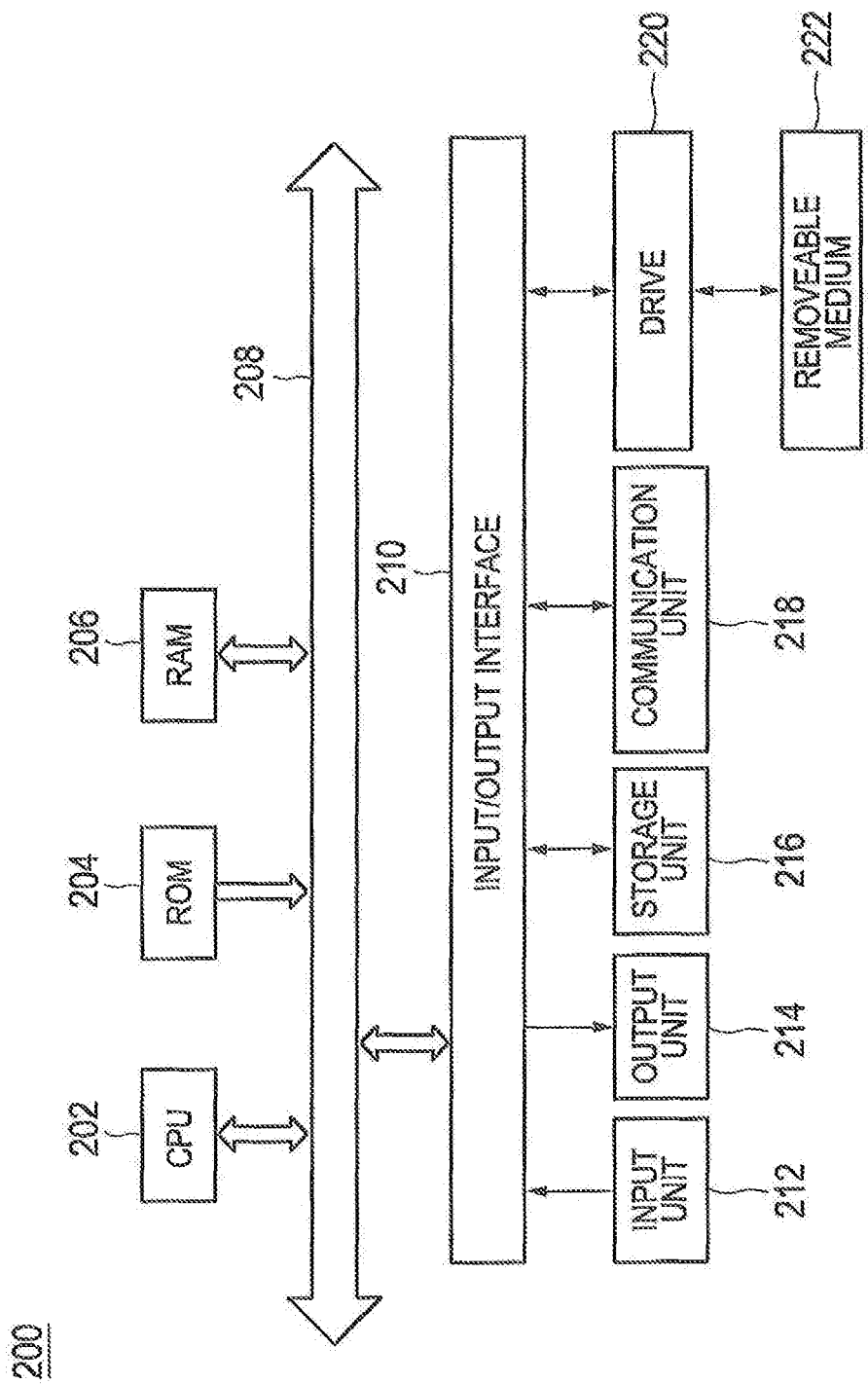
FIG. 2a illustrates structures of an electronic device for classifying a vehicle according to an embodiment of the present application.

It will be appreciated by those ordinarily skilled in the art that the foregoing brief description and the following detailed description are exemplary (i.e., illustrative) and explanatory of the subject matter as set forth in the present application, but are not intended to be restrictive thereof or limiting of the advantages that can be achieved by the present application in various implementations. Additionally, it is understood that this detailed description is representative of some embodiments as set forth in the present application, and are neither representative nor inclusive of all subject matter and embodiments within the scope as set forth in the present application.

FIG. 1 illustrates a system for classifying a vehicle according to an embodiment of the present application. The system 100 includes a vehicle 104 that uses a plurality of satellites 110 for navigation. The travel path of the vehicle 104 is recorded as GPS tracks in a database 106. In one embodiment, the database 106 includes low frequency GPS tracks, which are commonly used for vehicle tracking in commercial applications. A classifier 108 retrieves the low frequency GPS tracks and uses them to classify the vehicle. In one embodiment, the classifier 108 uses a machine learning algorithm to automatically classify the vehicle 106 into a plurality of categories as specified by a government agency. In another embodiment, the machine learning algorithm makes a binary classification for the vehicle, such as a heavy duty category or a light duty category. The communication network 102 should be broadly construed to include any one or more of a number of types of networks that may be created between devices using an internet connection, a LAN/WAN connection, a telephone connection, a wireless connection, a short message system (SMS), a satellite connection, and so forth.

FIG. 2a illustrates a general structure of an electronic computing device that may be used as the classifier 108. The exemplary structure 200 includes a CPU 202, a ROM 204, a RAM 206, a bus 208, an input/output interface 210, an input unit 212, an output unit 214, a storage unit 216, a communication unit 218, and a drive 220. The CPU 202, the ROM 204, and the RAM 206 are interconnected to one another via the bus 208, and the input/output interface 210 is also connected to the bus 208. In addition to the bus 208, the input unit 212, the output unit 214, the storage unit 216, the communication unit 218, and the drive 220 are connected to the input/output interface 210.

The CPU 202 executes various kinds of processing in accordance with a program stored in the ROM 204 or in accordance with a program loaded into the RAM 206 from the storage unit 216 via the input/output interface 210 and the bus 208. The ROM 204 has stored therein a program to be executed by the CPU 202. The RAM 206 stores as appropriate a program to be executed by the CPU 202, and data necessary for the CPU 202 to execute various kinds of processing. The CPU 202 may include multiple processors such as ASICs, FPGAs, GPUs, etc. A program may include any set of instructions to be executed directly (such as machine code) or indirectly (such as scripts) by the processor. In that regard, the terms "instructions," "steps" and "programs" may be used interchangeably herein. The instructions may be stored in object code format for direct processing by the processor, or in any other computer language including scripts or collections of independent source code modules that are interpreted on demand or compiled in advance. Functions, methods and routines of the instructions are explained in more detail below.

The input unit 212 includes a keyboard, a mouse, a microphone, a touch screen, and the like. When the input unit 212 is operated by the user, the input unit 212 supplies an input signal based on the operation to the CPU 202 via the input/output interface 210 and the bus 208. The output unit 214 includes a display, such as an LCD, or a touch screen or a speaker, and the like. The storage unit 216 includes a hard disk, a flash memory, and the like, and stores a program executed by the CPU 202, data transmitted to the terminal 200 via a network, and the like.

The communication unit 218 includes a modem, a terminal adaptor, and other communication interfaces, and performs a communication process via the networks of FIG. 1.

A non-transitory storage medium 222, sometimes removable, may be formed of a magnetic disk, an optical disc, a magneto-optical disc, flash or EEPROM, SDSC (standard-capacity) card (SD card), or a semiconductor memory. The medium 222 is loaded as appropriate into the drive 220. The drive 220 reads data recorded on the medium 222 or records predetermined data on the removable medium 222.

An operating system such as Microsoft Windows 7®, Windows XP® or Vista™, Linux®, Mac OS®, or Unix® may be used by the device 200. Other programs may be stored instead of or in addition to the operating system. It will be appreciated that a computer system may also be implemented on platforms and operating systems other than those mentioned. Any operating system or other program, or any part of either, may be written using one or more programming languages such as, e.g., Java®, C, C++, C#, Visual Basic®, VB.NET®, Perl, Ruby, Python, or other programming languages, possibly using object oriented design and/or coding techniques.

Data may be retrieved, stored or modified in accordance with the instructions. For instance, although the system and method is not limited by any particular data structure, the data may be stored in computer registers, in a relational database as a table having a plurality of different fields and records, XML documents, flat files, etc. The data may also be formatted in any computer-readable format such as, but not limited to, binary values, ASCII or Unicode. The textual data might also be compressed, encrypted, or both. By further way of example only, image data may be stored as bitmaps comprised of pixels that are stored in compressed or uncompressed, or lossless or lossy formats (e.g., JPEG), vector-based formats (e.g., SVG) or computer instructions for drawing graphics. Moreover, the data may comprise any information sufficient to identify the relevant information, such as numbers, descriptive text, proprietary codes, pointers, references to data stored in other memories (including other network locations) or information that is used by a function to calculate the relevant data.

According to an embodiment of the present application, the system, method, algorithm, step, and process as disclosed in the present application may be implemented as hardware, software, or both. When the algorithm and process are implemented as software, such as an executable program, the algorithm and process are stored in the medium 222. The general structure as shown in FIG. 2a needs to be specifically configured to process the algorithm and process as disclosed in the present application. For example, the programs need to be installed in the device 200 and registered in the operation system. Thus, those individual instructions included in the programs transfer the exemplary structure from a general computer to a special designed device to execute the algorithm and process as disclosed in the present application.

FIG. 2b illustrates functional blocks of a classifier 108 according to an embodiment of the present application. The classifier 108 may be understood as an electronic device that executes a machine learning algorithm that is configured to make a prediction of an unseen instance based on the knowledge obtained through a training process. A classifier has a plurality of possible models. From all the possible models, an actual model is established by fixing the parameters of that class of models. These classifiers may require training before being used for classifying an unknown instance. The training process uses a set of known instances, which may be known as a "training set" to train these models to make satisfactory inferences about characteristics of these known instances. During the training process, the types of models and the parameters of these models are adjusted and tested on the training set. Once a performance evaluator indicates a satisfactory performance of the prediction or a better performance among all models, the parameters and the type of models are fixed. Once the type of the model and their parameters have been fixed, then the model is defined and ready to be used for a subsequent phase, which may be known as the "prediction phase." During the prediction phase, the established model is used to predict characteristics, such as classification of a vehicle, of unseen instances of the problem under investigation. The classifier may go through the training phase again when needed.

Some known classifiers include Support Vector Machine ("SVM"), neural network, decision trees, and random forest. In an embodiment, the present application uses SVM as a classifier, which will be described in in detail in this application. Details of the other classifiers, which the present application may also adopt, may be found in the following references, the entirety of which are incorporated herein by reference:

For neural network, please see Rosenblatt, F. (1957). "*The perceptron, a perceiving and recognizing automaton Project Para.*," Cornell Aeronautical Laboratory, and Yann LeCun, Yoshua Bengio; (2015) Geoffrey Hinton, "*Deep learning*", Nature, 521, 436-444. doi:10.1038/nature14539

For decision trees, please see Breiman, L.; Friedman, J. H.; Olshen, R. (1999). "*Classification and Regression Trees*," CRC Press, New York.

For random, forest, please see Breiman, L. (2001) "*Random Forests*," Machine Learning 45 (1): 5-32. doi:10.1023/A:1010933404324.

As shown in FIG. 2b, the classifier includes a pre-processing module 262 that derives data and generates features from the low frequency GPS tracks 250, a training module 264 that determines the optimal feature set 258 and establishes a model, such as the SVM based on kernel 254, and a prediction module 266 that determines the class of a vehicle. In a prediction phase, the low frequency GPS tracks 250 are provided to the pre-processing module 262, which provides extracted feature sets to the prediction module 266, such as the SVM with kernel 254 and a plurality of operating parameters 256 determined by the training module 264. The prediction module 266 processes the extracted features sent from the pre-processing module 262 according to the optimal feature set 258 and then makes a prediction of the vehicle class. The training module 264 may include a performance evaluator 262, which is used to determine, in a training phase, the plurality of the operating parameters 256 of the kernel 254. The training module 264 may also include a feature selection module 260 that determines an optimal feature set 258, during the training phase, for classifying the vehicles. It is noted that the training module 264 that has the feature selection module 260 and the performance evaluator module 262 may not be part of the classifier 108 and may be implemented in a device that is independent from the classifier 108. More Detailed Functions and processing of the classifier 108 will be explained in the following section of this application.

Figure 3A:
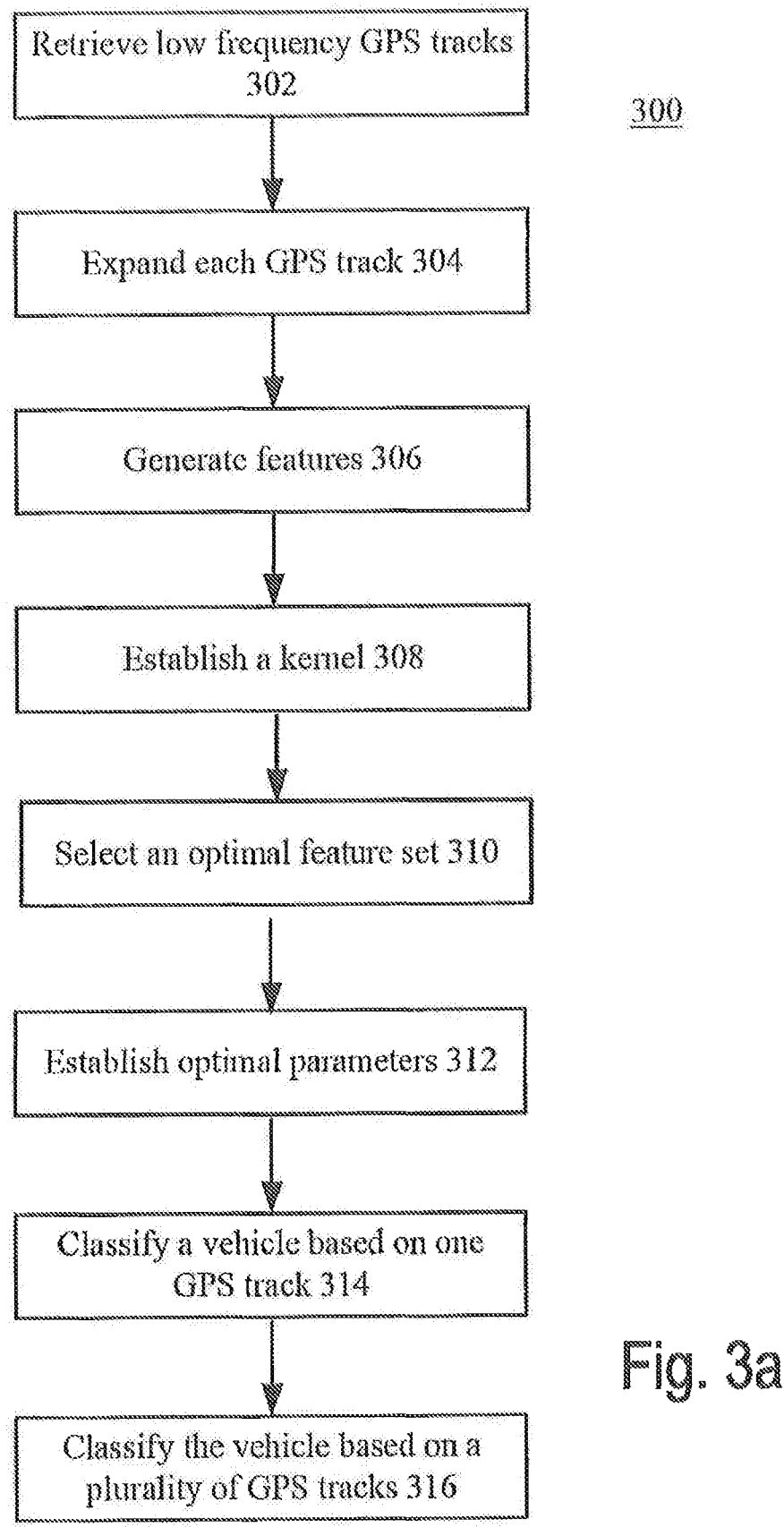
FIG. 3a illustrates a method for classifying a vehicle according to an embodiment of the present application.

FIG. 3a illustrates a vehicle classification method according to an embodiment of the present application. The method 300 starts at step 302, which retrieves a plurality of low frequency GPS tracks from the database 106. At step 304, the method 300 expands each low frequency GPS track by adding additional data, such as interval speed and acceleration data, such as those determined according equations (1), (2), (3) in the following section of this application, to the track. At step 306, the method 300 extracts a plurality of data set, sequences, or groups from the expanded GPS tracks, selects a plurality of statistical functions, and generates a plurality of features by aggregating those extracted data groups with the selected statistical functions. Step 306 further generates empirical features, such as the total distance of a track and domain related features. At step 308, the method 300 establishes a kernel for the machine learning algorithm based on training data. At step 310, the method 310 determines an optimal feature set for classifying vehicles. Step 310 ranks each feature based on their impact on classification performance and then combines features from the highest ranked one to the lowest ranked one. The optimal feature set is selected when the inclusion of an additional feature in the feature set only marginally increases the classification performance. At step 312, the method 300 establishes optimal parameters for the machine learning algorithm, such as a Support Vector Machine. At step 314, the machine learning algorithm classifies a vehicle based on the generated features of one GPS track. At step 316, the machine learning algorithm makes further classifications based on a plurality of GPS tracks.

The method 300 may be dividable into at least two phases: a training phase and a prediction phase. The training phase may include steps 302, 304, 306, 308, 310 and 312 and is designed to select an optimal feature set for the classifier and establish parameters of a model. The prediction phase may include steps 302, 304, 306, 314 and 316 and make predictions of vehicle classification based on the generated features and the established model.

Figure 3B:
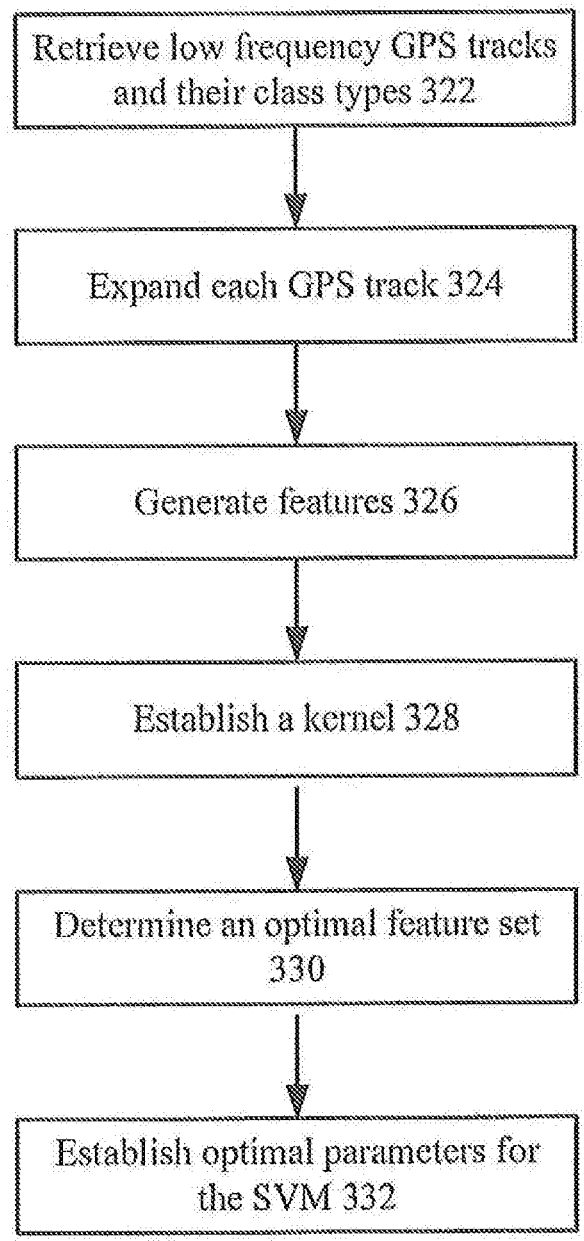
FIG. 3b illustrates the training phase for classifying a vehicle according to an embodiment of the present application.

FIG. 3b illustrates the training phase of a vehicle classification method according to an embodiment of the present application. The training phase starts at step 322, which retrieves a plurality of low frequency GPS tracks from the database 106 with known vehicle classes. At step 324, the training phase expands each low frequency GPS track by adding additional data, such as interval speed and acceleration data, such as those determined according equations (1), (2), (3) in the following section of this application, to the track. At step 326, the training phase extracts a plurality of data set, sequences, or groups from the expanded GPS tracks, selects a plurality of statistical functions, and generates a plurality of features by aggregating those extracted data groups with the selected statistical functions. Step 326 further generates empirical features, such as the total distance of a track and domain related features. At step 328, a kernel is established. For example, the type of a kernel is selected. At step 330, the training phase determines an optimal feature set for classifying vehicles. Step 330 ranks each feature based on their impact on classification performance and then combines features from the highest ranked one to the lowest ranked one. The optimal feature set is selected when the inclusion of an additional feature in the feature set only marginally increases the classification performance. At step 332, the training phase determines the optimal parameters for the machine learning algorithm based on training data.

Figure 3C:
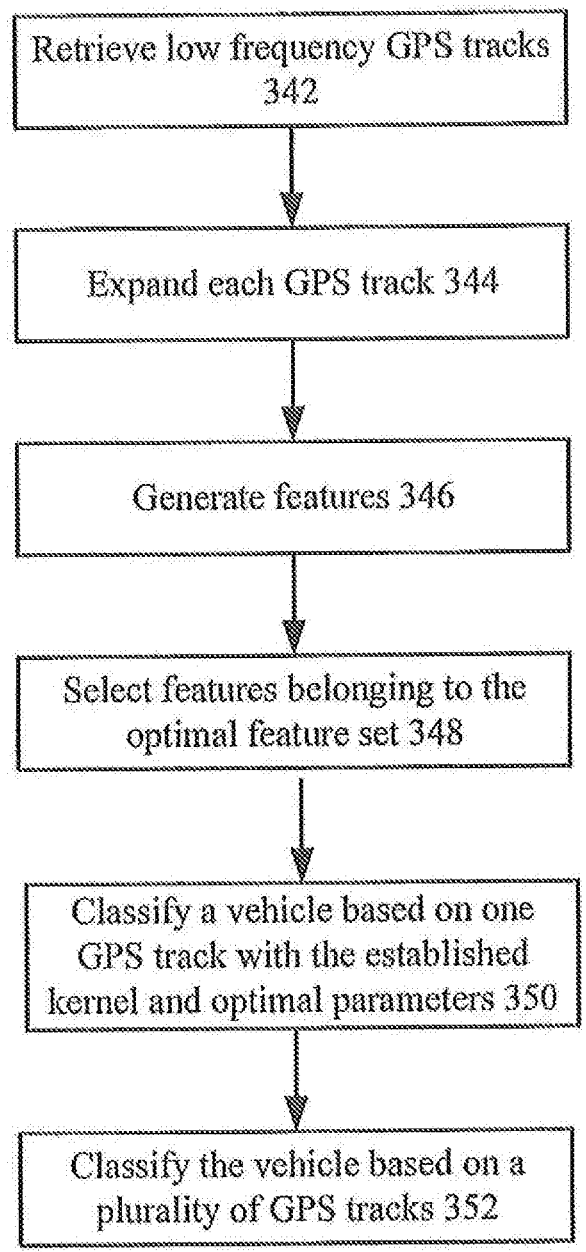
FIG. 3c illustrates the prediction phase for classifying a vehicle according to an embodiment of the present application.

FIG. 3c illustrates the prediction phase of a vehicle classification method according to an embodiment of the present application. At step 342, the prediction phase retrieves a plurality of low frequency GPS tracks from the database 106. These GPS tracks represent unknown instances whose vehicle classifications are to be determined by the classifier. At step 344, the prediction phase expands each low frequency GPS track by adding the same additional data that has been added in the training phase at step 324. At step 346, the prediction phase extracts the same of data sets, sequences, or groups that are extracted in the training phase from the expanded GPS tracks, and selects the same plurality of statistical functions that are selected in the training phase at step 326, and generates a plurality of features by aggregating those extracted data groups with the selected statistical functions. Step 346 further generates the same empirical features that are generated during the training phase, such as the total distance of a track and domain related features. At step 348, the method 300 selects only the features belonging to the optimal feature set determined during the training phase at step 330. At step 350, the machine learning algorithm classifies a vehicle based on the selected features of one GPS track. At step 352, the machine learning algorithm makes further classifications based on a plurality of GPS tracks.

In one embodiment of the present application, the training phase needs to be performed at least once on a training set with known classes such that a trained classifier is established for the prediction phase. The training phase may be performed once, be triggered by a plurality of events that represent substantial changes of the data or the instances to be predicted from the data, or be periodically performed. For example, the sampling interval of the low frequency GPS tracks may be different from one set of tracks to another, which may trigger the training phase. The geographical location of these GPS tracks may change significantly from one set to another, which may trigger the training phase. Even if the GPS tracks are collected for the same city, the change of the traffic patterns over time may also trigger the training phase.

Low Frequency GPS Tracks

As mentioned before, the method and system as set forth in the present application uses low frequency GPS tracks to classify a vehicle. A GPS track of a vehicle includes a sequence of GPS samples (or points) $\{Pi\}=\{P1, \ldots, Pn\}$, where P1 represents the first point that is obtained immediately after the engine of the vehicle is turned on, and Pn represents the last point that obtained just before the engine is turned off. Each GPS data point Pi contains a plurality of components, including position coordinates $p_i$ (such as latitude and longitude), odometer distance $d_i$ of the vehicle, timestamp $t_i$ indicating the time when the data point is generated, and instantaneous speed $V_i$ at time $t_i$. For each component in a GPS track, $\{p_i\}$ represents a sequence of the position components, $\{d_i\}$ represents a sequence of the distance components, $\{t_i\}$ represents a sequence of the time components, and $\{v_i\}$ represents a sequence of the instantaneous speed components. It is worth pointing out that the sampling rates in a track or across tracks may not be uniform, as the sampling rates collected by GPS devices vary depending on the GPS device itself and, even in the same device, depending on travel conditions. such as vehicle speed or the occurrence of asynchronous triggers, like e.g. harsh driving events.

Figure 4:
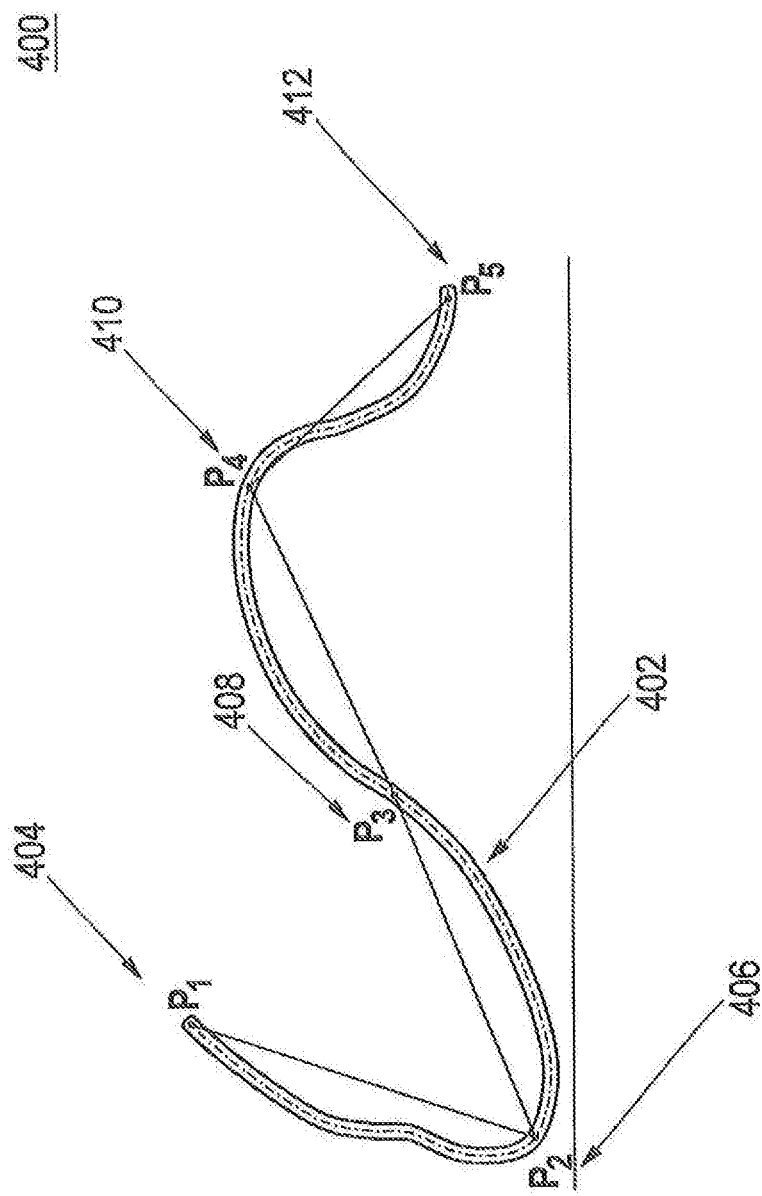
FIG. 4 illustrates a low frequency GPS track according to an embodiment of the present application.

A low frequency GPS track refers to a GPS track that has a relatively long sampling interval. Comparing with a high frequency GPS track, which typically has a sampling interval of 3 seconds or shorter, a low frequency GPS track has sample intervals of at least 20 seconds. In some applications, the sampling interval of a low frequency GPS track is at least 30 second. In an embodiment of the present application, the sampling interval of the GPS tracks is at least 60 seconds, which correspond to sampling rates that are no more than 1 data point per minute. FIG. 4 illustrates a low frequency GPS track 400 of a vehicle according to an embodiment of the present application. As shown in FIG. 4, a low GPS track 400 includes a sequence of five data points P1 to P5, which is referred by reference numerals 404, 406, 408, 410, and 412, respectively. The data corresponding to P1 to P5 are shown in the following Table 1. P1 was collected when the engine of the vehicle was started, which has a time stamp of 0 second, an instantaneous speed of 0 m/s, and a distance of 0 meter. P2 to P4 were collected while the vehicle was traveling along a route 402. P5 was the last data collected before the engine was turned off, which has an instantaneous speed of 0 m/s. The time intervals between these data points are 120 seconds between P1 and P2, 119 seconds between P2 and P3, 110 seconds between P3 and P4, and 91 seconds between P4 and P5, respectively, which show that the data points were collected at a low frequency. The distances between these data points traveled by the vehicle are 678 meters between P1 and P2, 1152 meters between P2 and P3, 960 meters between P3 and P4, and 1182 meters, respectively.

TABLE 1

| | Time | Position | Speed | Distance |
|---|---|---|---|---|
| $P_1$ | 0.0 s | (42.13222, −72.55265) | 0.0 m/s | 0.0 m |
| $P_2$ | 120.0 s | (42.13737, −72.54227) | 6.1 m/s | 677.99 m |
| $P_3$ | 221.0 s | (42.12700, −72.54660) | 16.3 m/s | 1,830.12 m |
| $P_4$ | 311.0 s | (42.11551, −72.55024) | 17.1 m/s | 2789.96 m |
| $P_5$ | 402.0 s | (42.10739, −72.54664) | 0.0 m/s | 3792.06 m |

As the GPS data were collected at a low frequency, the data points P1 to P5, without further processing, fail to provide accurate and comprehensive information of the travel route 402 of the vehicle. The low frequency GPS track does not reveal acceleration of the vehicle either, which is often used to classify a vehicle. As shown in FIG. 4, when the data points P1 and P5 are connected with straight lines, the connected lines do not resemble the actual travel route 402, which is a curved road. Thus, to compensate the lack of information of the low frequency GPS data, the method and system as set forth in the present application include algorithms that expand the GPS track by deriving more data from the low frequency GPS tracks and adding the derived data into the data sequence of the low frequency GPS tracks.

Additional Data Derived from a Low Frequency GPS Track (Step 304)

In one embodiment, the system and method of the present application derive instantaneous acceleration of the vehicle based on a low frequency GPS track. In another embodiment, the system and method of the present application further derive interval speed and interval acceleration from a low frequency GPS track. These derived data are then used to provide additional features for classifying a vehicle, that have proven to be more reliable in classifying vehicles compared with the one derived from mere instantaneous data of the low frequency GPS track.

The interval speed is calculated based on the distance between two consecutive data points and their corresponding time stamps, which is shown by the following equation:

$$\tilde{v}_i = \frac{d_i - d_{i-1}}{t_i - t_{i-1}}. \tag{1}$$

The instantaneous acceleration is calculated based on the difference between two consecutive instantaneous speed and their corresponding time stamps, which is shown by the following equation:

$$a_i = \frac{v_i - v_{i-1}}{t_i - t_{i-1}}. \tag{2}$$

The interval acceleration is calculated based on the difference between two consecutive interval speeds and their corresponding time stamps, which is shown by the following equation:

$$\tilde{a}_i = \frac{\tilde{v}_i - \tilde{v}_{i-1}}{t_i - t_{i-1}}. \tag{3}$$

FIG. 5a show a vehicle's speed profiles of both instantaneous speed and the interval speed in a time period of about 7000 second (about 1 hour and 46 minutes). FIG. 5b shows the corresponding acceleration profiles of the same vehicle. The travel conditions of the vehicle, such as route conditions, may be inferred from these speed and acceleration profiles. For example, from the start of the vehicle to about 1800 seconds, the instantaneous speed profile of the vehicle in FIG. 5a has a zigzag shape with several peaks and valleys. This may suggest that the vehicle traveled along a local route and made several stops due to work orders or traffic conditions. It may also be inferred that from about 1800 seconds to 4800 seconds, the vehicle may travel on a high way, which has a high speed and may occasionally reduce speed due to traffic situations. It may also be inferred that from about 4800 seconds to the stop of the engine, the vehicle may have traveled off the highway and traveled again on a local street. In FIG. 5a, the solid line 502 represents the instantaneous speed profile, which is very "noisy," as indicated by many valleys and peaks. The dash line 504 represents the interval speed profile, which is a smoother curve than the instantaneous speed profile 502, as shown by valleys and peaks having a smaller amplitude than the instantaneous speed profile. A similar observation is also made to the acceleration profile in FIG. 5b. As shown in FIG. 5b, the peaks and valleys in the instantaneous acceleration profile 506 are a lot greater than those of the interval acceleration profile 508. Based on these observations, it is concluded that instantaneous data in low frequency GPS tracks, although very noisy, can capture short parts of the track with high discriminative information (such as high speed events). On the other hand, the interval data derived from the low frequency GPS tracks may provide a more reliable and smoother estimate of the trend of speed or acceleration along a traveled route. Thus, the instantaneous data and the interval data are complementary to each other, and together they are capable of providing a comprehensive and reliable picture of vehicle's operating conditions along a traversed path.

Classifying Features Generated by Aggregation (Step 306)

According to an embodiment of the present application, the method and system first select a plurality of data sets from the expanded GPS track and then generate classifying features from the data sets by aggregation. As discussed before, the expanded low frequency GPS track includes not only the raw GPS data, such as the position information, time stamp, instantaneous speed, and distance, but also includes the derived data, such as instantaneous acceleration, interval speed, and interval acceleration. Data sets are extracted and selected from all data points along the entire track such that the selection and extraction both capture useful data and reduce random events. For example, the acceleration and deceleration pattern of a vehicle is very informative in classifying that vehicle. But, track points where the speed is equal to zero may be less useful for recognizing the class of a vehicle and may not be used for the analysis. Based on analogous observations, in one embodiment, the system and method extract six data sets from an expanded GPS track, including a first data set having only positive instantaneous accelerations, a second data set having all negative instantaneous accelerations, a third data set having all positive interval accelerations, a fourth data set having all negative interval accelerations, a fifth data set having all positive instantaneous speeds, and a sixth data set having all positive interval speeds, which are represented by the following equations, respectively:

$$\{a_{>0}\} = \{a_i | a_i > 0, i=1, \ldots, n\} \quad (4)$$

$$\{a_{<0}\} = \{-a_i | a_i < 0, i=1, \ldots, n\} \quad (5)$$

$$\{\tilde{a}_{>0}\} = \{\tilde{a}_i | \tilde{a}_i > 0, i=1, \ldots, n\} \quad (6)$$

$$\{\tilde{a}_{<0}\} = \{-\tilde{a}_i | \tilde{a}_i < 0, i=1, \ldots, n\} \quad (7)$$

$$\{v_{>0}\} = \{v_i | v_i > 0, i=1, \ldots, n\} \quad (8)$$

$$\{\tilde{v}_{>0}\} = \{\tilde{v}_i | \tilde{v}_i > 0, i=1, \ldots, n\}. \quad (9)$$

The sets in 0061 are used in addition to the speed and acceleration sequences or data sets already included in the expanded GPS track. Thus, a total of 10 data sequence and data sets are extracted and are used for generating classifying features, which are shown in the following Table 2.

TABLE 2

| Variable | Description |
|---|---|
| $\{v_i\}_{i=1}^n$ | speed sequence |
| $\{\tilde{v}_i\}_{i=1}^n$ | interval speed sequence |
| $\{a_i\}_{i=1}^n$ | acceleration sequence |
| $\{\tilde{a}_i\}_{i=1}^n$ | interval acceleration sequence |
| $\{a > 0\}$ | positive acceleration set |
| $\{a < 0\}$ | deceleration set |
| $\{\tilde{a} > 0\}$ | positive interval acceleration set |
| $\{\tilde{a} < 0\}$ | interval deceleration set |
| $\{v > 0\}$ | positive speed set |
| $\{\tilde{v} > 0\}$ | positive interval speed set |

After the data sets are extracted, the method and system of the present application generate a plurality of features for the kernel 254 in the classifier 108, which will use the features to automatically classify a vehicle. In one embodiment, the plurality of features include the results generated by the application of statistic functions to the extracted data sets. In one embodiment, the system and method of the present application use 13 statistical functions for generating classifying feature, as shown in the following Table 3:

TABLE 3

| Function | Description |
|---|---|
| mean | mean value of the sequence |
| std | standard deviation of the sequence |
| median | median value of the sequence |
| mad | median absolute deviation of the sequence |
| iqr | interquartile range of the sequence |
| 75th | 75th percentile of the values in the sequence |
| 90th | 90th percentile of the values in the sequence |
| 95th | 95th percentile of the values in the sequence |
| hist1 | fraction of samples in the first bin of the 6-bin histogram |
| hist2 | fraction of samples in the first 2 bins of the 6-bin histogram |
| hist3 | fraction of samples in the first 3 bins of the 6-bin histogram |
| hist4 | fraction of samples in the first 4 bins of the 6-bin histogram |
| hist5 | fraction of samples in the first 5 bins of the 6-bin histogram |

The 13 statistical functions shown in Table 3 are well-known to a person of ordinary skill in the art, and detailed description about these statistical functions are not required in this application. As to the histograms, 6 histogram bins for the aggregation functions hist1, . . . , hist5 are used, in which all the values of all tracks in the training set for a feature sequence, e.g. all values of speed in the training set, are considered. The interval between the 5th and 95th percentiles is divided into 6 bins, among which hist6 is not used as feature as it always includes all samples of the sequence.

For each data set or sequence, 13 features are generated when it is aggregated by the 13 statistical functions. For example, when the sequence of instantaneous speed of a track is aggregated by the statistical functions, the following 13 features are generated:

(1) a mean value of the instantaneous speeds of the track,
(2) a standard deviation of the instantaneous speeds of the track,
(3) a median value,
(4) a median absolute deviation,
(5) an interquartile range,
(6) a $75^{th}$ percentile value,
(7) a $90^{th}$ percentile value,
(8) a $95^{th}$ percentile value,
(9) a hist1 value,
(10) a hist2 value,
(11) a hist3 value,
(12) a hist4 value, and
(13) a hist5 value.

Thus, When the 10 data sets or sequences in Table 2 are aggregated by the 13 statistical functions in Table 3, a total of 130 features are generated for each low frequency GPS track. These 130 features will be provided to a classifier that will use them to classify a vehicle.

Classifying Features Based on Experience (Step 306)

In one embodiment, the present method and system further include a plurality of empirical features to be used to classify the vehicles. The empirical features include the total distance of a traveled route, which may be calculated from a GPS track. The empirical features may also include domain related features, such as the category of a road, which may be motorway, highway, trunk road, country road, city road, and residential road. These domain related features may be obtained from a third party vendor based on the position information of a GPS track. For example, each position, such as a latitude/longitude pair, is processed with the commercial product PTV xServer or any other reverse geocoding service, e.g., OpenStreetMap.

Thus, the total number of features that may be used by a machine learning algorithm to classify a vehicle is 137 (130 (aggregated features)+1 (distance)+6 (domains)) according to an embodiment of the present application. In one embodiment, the machine learning algorithm uses the entire feature set to classify a vehicle. In another embodiment, the machine learning algorithm uses a predetermined number of features to classify a vehicle.

Kernel, Operating Parameters, and Performance Evaluators (Step 308)

In one embodiment of the present application, the classifier 108 may be a Support Vector Machine ("SVM") similar as those described in C. Cortes and V. Vapnik, "Support-vector networks," Machine Learning, Vol. 20, No. 3, pp. 273-297, 1995, the entirely of which is incorporated herein by reference. An SVM includes a kernel with numerical parameters. In one embodiment, the kernel type and the numerical parameters are selected based on a classification performance measure (262 in FIG. 2*a*), such as the adopted Area Under ("AUC") the Receiver Operating Characteristic Curve ("ROC"), and are selected via k-fold cross-validation. A ROC curve represents a graphical plot that illustrates the performance of a binary classifier system as its discrimination threshold is varied. The curve is created by plotting the true positive rate ("tpr") against the false positive rate ("fpr") at various threshold settings, where $$tpr = \frac{TP}{TP+FN}, fpr = \frac{FP}{FP+TN}. \tag{10}$$

The area under the ROC curve depends on both false positives and true positives: this lets it penalize models which are representative but not discriminative and, thus, makes it robust even in the case of unbalanced datasets. In one embodiment, a radial basis function ("RBF") is selected as the kernel of the machine learning algorithm. To obtain the operating parameters of an SVM, the classifier is trained by GPS tracks of vehicles whose classification are known. With AUC as the measure for evaluating the classifying performance of a kernel, the operating parameters of the kernel are tuned to yield optimal classifying results from the GPS tracks of known vehicle types.

Optimal Feature Set (Step 310)

The method and system of the present application also includes a feature selection algorithm (260 in FIG. 2*a*) with the aim to reduce the dimensionality of the feature space in order to overcome the risk of overfitting, in which a learning model is too fit to the training data and unable to generalize to unseen data. Feature selection refers to the process of selecting a subset of features from all available features, in which the prediction capability of a subset of feature is generally evaluated based on performance indicators, such as the ability of the classifier to correctly predict the label of an unseen instance. In one embodiment, the method and system of the present application uses a recursive feature elimination ("RFE") algorithm for feature ranking and selection, which is similar to those described in I. Guyon, et al., "Gene selection for cancer classification using support vector machines," *Machine Learning*, Vol. 46, No. 10-3, pp. 389-422, 2002, the entirety of which is incorporated herein by reference. The RFE implements an iteration process to remove, each time, one feature that has the least impact on the classification performance. In the first iteration, the RFE first uses all the features for classification and then tests the impact of each feature on the classification performance by removing features from the classification process one by one. Then, the RFE determines the least effective one from the feature set based on the AUC. Then, RFE removes the least effective one from the feature set, and starts another iteration. By the end of all the iterations, each feature has a rank indicating their impact on the classification performance. In another embodiment, the present application may use any other available feature selection algorithms. For example, a linear correlation method may be used, in which a correlation (Pearson correlation) between a feature and the output value is determined and is used to rank the features. The selection of features could be done by using a predetermined number of features or by using only the features that have an absolute correlation value over a given threshold. In addition, other feature selection methods may also be those as taught by the following references, the entirety of which are incorporated herein by reference:

Kira K.; Rendell L A. (1992), "*A practical approach to feature selection,*" Proceedings of the ninth international workshop on Machine learning: 249-256;

BenoíT, F., Van Heeswijk, M., Miche, Y., Verleysen, M., & Lendasse, A. (2013). "*Feature selection for nonlinear models with extreme learning machines,*" Neurocomputing, 102, 111-124;

Zaffalon, M., & Hutter, M. (2002, August), "*Robust feature selection by mutual information distributions,*" In Proceedings of the Eighteenth conference on Uncertainty in artificial intelligence (pp. 577-584). Morgan Kaufmann Publishers Inc.;

Bi, J., Bennett, K., Embrechts, M., Breneman, C., & Song, M. (2003). "*Dimensionality reduction via sparse support vector machines,*" Journal of Machine Learning Research, 3(March), 1229-1243; and Seth, S.; Principe, J. C. (2010, December), "*Variable selection: A statistical dependence perspective,*" In Machine learning and applications (icmla), 2010 ninth international conference on (pp. 931-936). IEEE.

The pseudocode of this RFE procedure is shown in the following Table 4. The data set is first split by performing k-fold cross-validation, stratified on the two classes, to be able to statistically assess classification performance on k sets of independent data (line 1 of the table). For each cross validation train/test pair, the number of features is halved at each iteration of RFE by discarding those features whose removal yields to the lowest AUCs. Therefore, given the number of input features, it can be pre-computed the number of iterations, line 2, and the number of features to be removed at each iteration, array B, line 4. At each RFE iteration, to compute AUCs we first set aside one feature at a time from the set of remaining features, train the model on the train set and assess the corresponding AUC on the test set (line 10).

TABLE 4

Algorithm 1 Recursive Feature Elimination

Input: Dataset $D \in \mathcal{M}_{n \times m}(\mathbb{R})$
Output: Best feature set
1: $(Train_1, Test_1), \ldots, (Train_k, Test_k) \leftarrow \text{kFoldCV}(D)$
2: $\overline{m} \leftarrow \lceil \log_2 m \rceil + 1$ 3: Define $R \in \mathcal{M}_{k \times \overline{m}}(\mathbb{R})$, $AUC \in \mathcal{M}_{k \times \overline{m}}(\mathbb{R})$, $B \in \mathbb{R}^{\overline{m}}$, $R^{med} \in \mathbb{R}^{\overline{m}}$ 4: $B \leftarrow \left\{ m, \lceil m/2 \rceil, \left\lceil \frac{\lceil m/2 \rceil}{2} \right\rceil, \ldots, 1 \right\}$ 5:   for i ← 1 to k do
6:     features ← {1, . . . , m}

TABLE 4-continued

Algorithm 1 Recursive Feature Elimination

7:     $AUC_{i,1}$ ← AUC of the classifier trained on $Train_i$ and tested on $Test_i$, with features features
8:     for b ← 2 to $\overline{m}$ do
9:        for j ← 1 to length (features) do
10:          Compute AUC of the classifier trained on $Train_i$ and tested on $Test_i$, with features feautures \j
11:        end for
12:        features ← Best $B_b$ features
13:        s ← 1 + $\Sigma_{i-2}^{b-1} B_i$, e ← $\Sigma_{i-2}^{b} B_i$
14:        $R_{i,s...e}$ ← {worst $B_b$ features, ordered by AUC }
15:        $AUC_{i,b}$ ← AUC of the classifier trained on $Train_i$ and tested on $Test_i$, with features features
16:        end for
17:     end for
18:     for b ← 1 to $\overline{m}$ do
19:        $R_b^{med}$ ← median rank across $R_{1,b}, \ldots, R_{k,b}$
20:     end for
21:     pVal ← 0, i ← $\overline{m}$
22:     while pVal < 0.05 and t > 1 do
23:        pVal ← p-value of a Wilcoxon signed-rank test for significantly larger median between the AUC distributions $\{AUC_{1,t}, \ldots, AUC_{k,t}\}$ and $\{AUC_{1,t-1}, \ldots, AUC_{k,t-1}\}$
24:        t ← t − 1
25:     end while
26:     f* ← $B_{t+1}$
27:     return f* features with the lowest median rank $R_{med}$ At the end of this procedure, a ranked list of features for each fold is obtained and stored in the rows of the matrix of ranks R (line 14). To compute a ranking over the whole training set, features are sorted according to their median rank across the k folds (line 19). To compute the optimal number of features, the sets $\{AUC_{1,t}, \ldots, AUC_{k,t}\}$ of AUCs obtained at each iteration of the RFE procedure. Each pair of sets of k AUCs, obtained with feature sets of increasing size are compared with a Wilcoxon signed-rank test for significantly larger median and are stopped when the test detects no significant increase in AUC, with confidence threshold 0.05 (lines 21 to 26). In one embodiment, 69 features among the 137 features are determined to form an optimal feature set.

Classifying Vehicles (Steps 312 and 314)

After the optimal feature set is selected and the kernel and the operating parameters are established, the machine learning algorithm classifies vehicles based on the features of a low frequency GPS track. The method and system of the present application demonstrated an improved performance than the algorithm as described in Z. Sun ("Sun"), "Vehicle classification using GPS data," Transportation Research Part C: Emerging Technologies, Vol. 37, pp. 102-117, No. 12, 2013, the entirety of which is incorporated herein by reference. It is noted that the method described in Sun is applied to high frequency data, whose sampling rate is about 3 seconds. The kernel first classifies a vehicle based on a single GPS track of low frequency, and then aggregates classifying results over a plurality of GPS tracks to improve the classifying performance.

Implementation of the Method in a Working Example

A. Data Collection

The low frequency GPS tracks were collected by Fleetmatics over two months of activity of vehicles in the USA. The GPS sampling rate of the devices varies depending on the status of the vehicle: if the speed is lower than a threshold while the engine is on, the vehicle is idling and the sampling interval is 120 s, otherwise the vehicle is moving and the sampling interval is 90 s. To build training data, a subset of vehicles tracked by Fleetmatics were manually labelled by considering the maker and model reported by the owner, dividing the data as follows:

CAR-compact and subcompact cars;
SUV-SUVs and jeeps;
VAN-vans and commercial vans;
PICKUP-pickups with engine capacity lower than 3.5 litres;
SMALLTRUCK-pickups with engine capacity higher than or equal to 3.5 litres, small sized trucks;
TRUCK-medium sized trucks; AND
BIGTRUCK-big sized trucks.

The labelling was mainly performed by visual inspection of the model of the vehicle and, thus, it depends on some judgement calls on the borders (e.g., the distinction between medium and big trucks). It is also worth noting that several car companies implement cutaway versions of vans and pickups, making them more similar to small trucks than pickups or vans. Finally, small pickups are used similarly to cars or vans mainly for people or small equipment transportation while heavy duty pickups, designed for the transportation of heavy loads, are more similar in utilization and GPS dynamics to small trucks. Therefore, we chose to put a threshold on the engine displacement, and to label pickups with engine displacement smaller than 3.5 litres as PICKUP, and as SMALLTRUCK otherwise.

Figure 6:
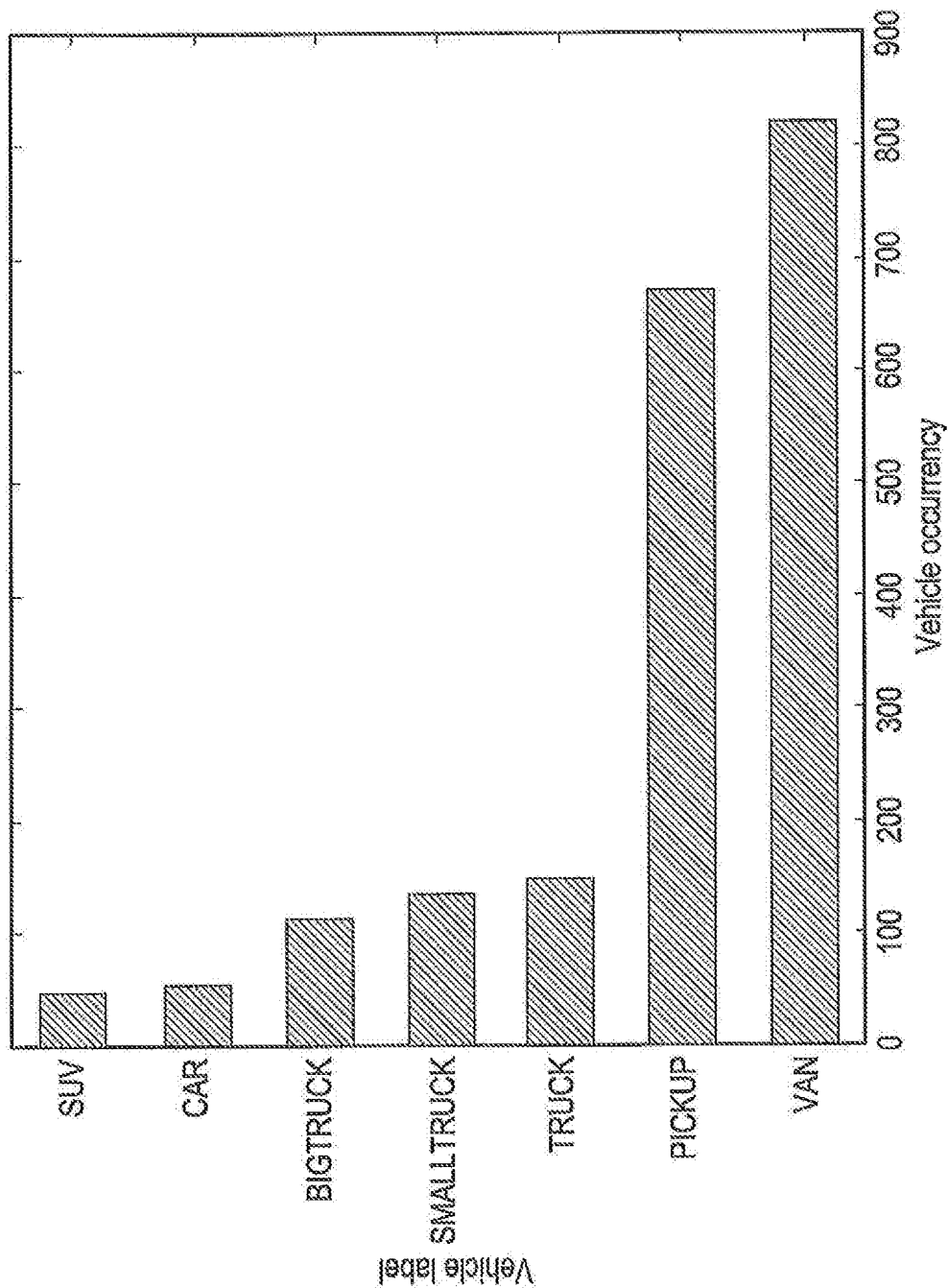
FIG. 6 illustrates the number of vehicles of different labels in a sample set according to an embodiment of the present application.

The vehicles were further grouped in two higher level classes in order to perform binary classification: CAR, SUV, VAN and PICKUP were labelled as LIGHT-DUTY, while SMALLTRUCK, TRUCK and BIGTRUCK were labelled as HEAVYDUTY. We collected GPS data of fleets that fall into the Small and Medium Businesses (SMBs) segment. The data included 1987 vehicles that were sampled from the set of Fleetmatics SMB customers stratifying on vehicle type, i.e., reproducing the distribution of the vehicle types in the business segment. The distribution of the vehicles across types in the sampled dataset is reported in FIG. 6. The vertical axis of FIG. 6 shows the several labels of the vehicles, while the horizontal axis shows the number of vehicles in each label. As it is clear from the figure, the vast majority of vehicles are PICKUPs and VANs.

For each vehicle, the full set of GPS samples over two months were segmented into GPS tracks by using engine on and engine off events triggered by the GPS devices. Only vehicles having at least 10 GPS tracks in the two months were considered. Furthermore, only tracks having at least 3 positive instantaneous and interval accelerations and 3 instantaneous and interval decelerations were considered. The final dataset is formed by 15,792 GPS tracks in the HEAVY-DUTY class and 103,122 GPS tracks in the LIGHTDUTY class. We split the dataset in a training set and a test set, composed of 993 and 994 vehicles and 58,525 and 58,453 tracks, respectively.

Finally, in order to obtain the road type information, each (latitude, longitude) pair was processed with the commercial product PTV xServer, but similar results could be obtained with any free reverse geocoding service, e.g., OpenStreetMap. As a result, the fractions of GPS samples in the train and test sets for each road type were 21.63% for motorway, 2.29% for highway, 3.41% for trunk road, 14.55% for country road, 25.96% for city road and 32.16% for residential road. These numbers reflect the operations distribution of Fleetmatics SMB customers, with 25/30% long haul trips on major roads and the remainder of traffic on country roads or city networks.

B. Comparison with Sun

To make a meaningful comparison between our approach and previous methods, we adapt the vehicle classification approach described in Sun (which is also referred to as "Baseline" in a few tables of this application) to our low frequency OPS data scenario. In the previous approach, Sun first split the acceleration sequence retrieved from OPS tracks in the set of (strictly positive) accelerations and decelerations. Then, to obtain features at the track level from a sequence of OPS samples, Sun separately aggregates the values from the two sets with two measures:

standard deviation of the values across the track; and fraction of values greater than 1 m/s$^2$.

The standard deviation of the acceleration can be computed also for low frequency data. However, note that acceleration is estimated over a much larger time interval: if we consider, for instance, a 60 seconds sampling rate, an acceleration larger than 1 m/s$^2$ could only be obtained observing a speed difference between two consecutive GPS samples of more than 60 m/s, i.e. 216 km/h, which is extremely unlikely to occur in real data. Thus, to adapt the approach in Sun to low frequency data, we consider a variable threshold T to define the informative part of the distribution of accelerations and decelerations, and we tune it via cross-validation from the training set. We assessed both the instantaneous and interval definitions of the acceleration and found that the second order version leads to slightly better classification performance, overall. Classification is then performed, as in Sun, using a Support Vector Machine with quadratic kernel.

C. Results

To select a suitable SVM kernel and tune its parameters for the method of the present application (which is also referred to as "Proposed Method" in the following tables), three commonly used kernels (linear, polynomial and Radial Basis Function, or RBF) were used. Several combinations of kernel parameters with grid search, using the entire feature set in a stratified 5-Fold cross validation are assessed. The results of kernel selection and parameter tuning are reported in the following Table 5, with RBF as the optimal kernel. The kernel parameters are then kept fixed during the feature selection step. When the optimal subset of features is identified stratified 5-Fold cross validation is used again to obtain the final C and kernel parameters, which are reported in the previous Table. To take into account unbalanced classes, the misclassification parameter C is weighted with respect to the number of training examples in each class for both methods.

TABLE 5

PERFORMANCE OF KERNEL FUNCTIONS BEFORE FEATURE SELECTION, ESTIMATED BY 5-FOLD CROSS VALIDATION ON THE TRAINING SET

| Kernel | Optimal parameters | ROC AUC |
|---|---|---|
| Linear | C = 1 | 0.6881 |
| Polynomial | C = 1 $c_0$ = 1 $\gamma$ = 0.01 d = 3 | 0.7973 |
| RBF | C = 46.4159 $\gamma$ = 0.0022 | 0.8036 |

The approach based on Sun was tuned using stratified 5-fold cross validation to estimate the optimal threshold T and the SVM parameter C, which maximize the AUC. The Optimal parameters used are reported in the following Table 6.

TABLE 6

OPTIMAL PARAMETERS USED IN THE EXPERIMENTS.

| Method | Optimal parameters |
|---|---|
| Baseline | C = 0.5623 T = 0.375 |
| Proposed Method | C = 46.4159 $\gamma$ = 0.0022 |

Figure 7:
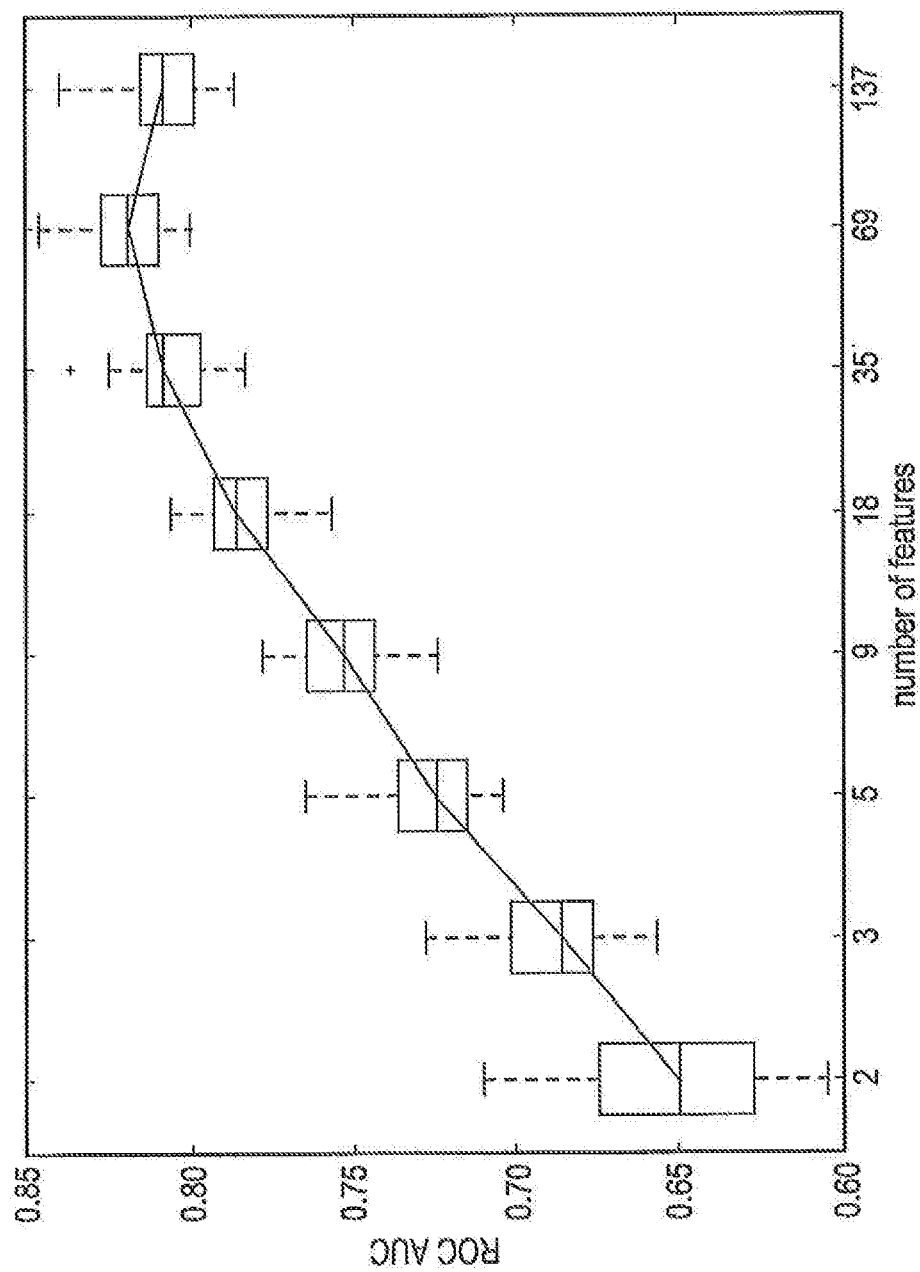
FIG. 7 illustrates a relationship between classifying performance and the number of features according to an embodiment of the present application.

The RFE algorithm has been applied with 15-fold cross validation to increase the statistical significance of the feature ranking. The box plots of the AUCs obtained in each step of the RFE algorithm are reported in FIG. 7. The vertical axis in FIG. 7 represents the ROC AUC, which is the evaluator for classifying performance. The horizontal axis in FIG. 7 is the number of features. As shown in FIG. 7, the classification is generally improved when more features are used for the classification. It is worth noting that the classifying performance is relatively at the same level when more than about 35 features are considered, as shown in FIG. 7. The one-tailed paired Wilcoxon test reported a p-value always lower than $5 \times 10^{-5}$, except on the comparison between 69 features and 137 features (p=0.997). Thus, the optimal number of features was set to 69.

FIGS. 8a and 8b list selected 69 features, along with their ranking, as an example of an optimal feature set. FIG. 8a lists the classifying features generated by aggregation. The top row 804 of FIG. 8a shows the 10 data sets or sequences used for generating the features. The leftmost column 806 of FIG. 8a shows the 13 statistical functions used to aggregate the data sets or sequences. The cells of the FIG. 8a that correspond to the 69 selected features have numerical values, which represent the ranking of a particular feature. For example, the feature representing the mean instantaneous speed 802 of a track is ranked "19" among all the features. FIG. 8b lists the empirical features, such as total distance and road types. These empirical features appear to have a relatively high ranking. For example, the feature 'total distance' has a rank of "1." Residential Road has a rank of "2." Truck road has a rank of "10." According to the feature selection results, the highly relevant features appear to include the travelled distance and the fraction of GPS samples in each type of road, combined with aggregated features regarding the distribution of the positive speed values (standard deviation, 95th percentile and fraction of samples in the first bins of the histogram). A few acceleration-based features are still relevant, although they appear to be generally less predictive than speed based measures when dealing with low frequency data.

Figure 9:
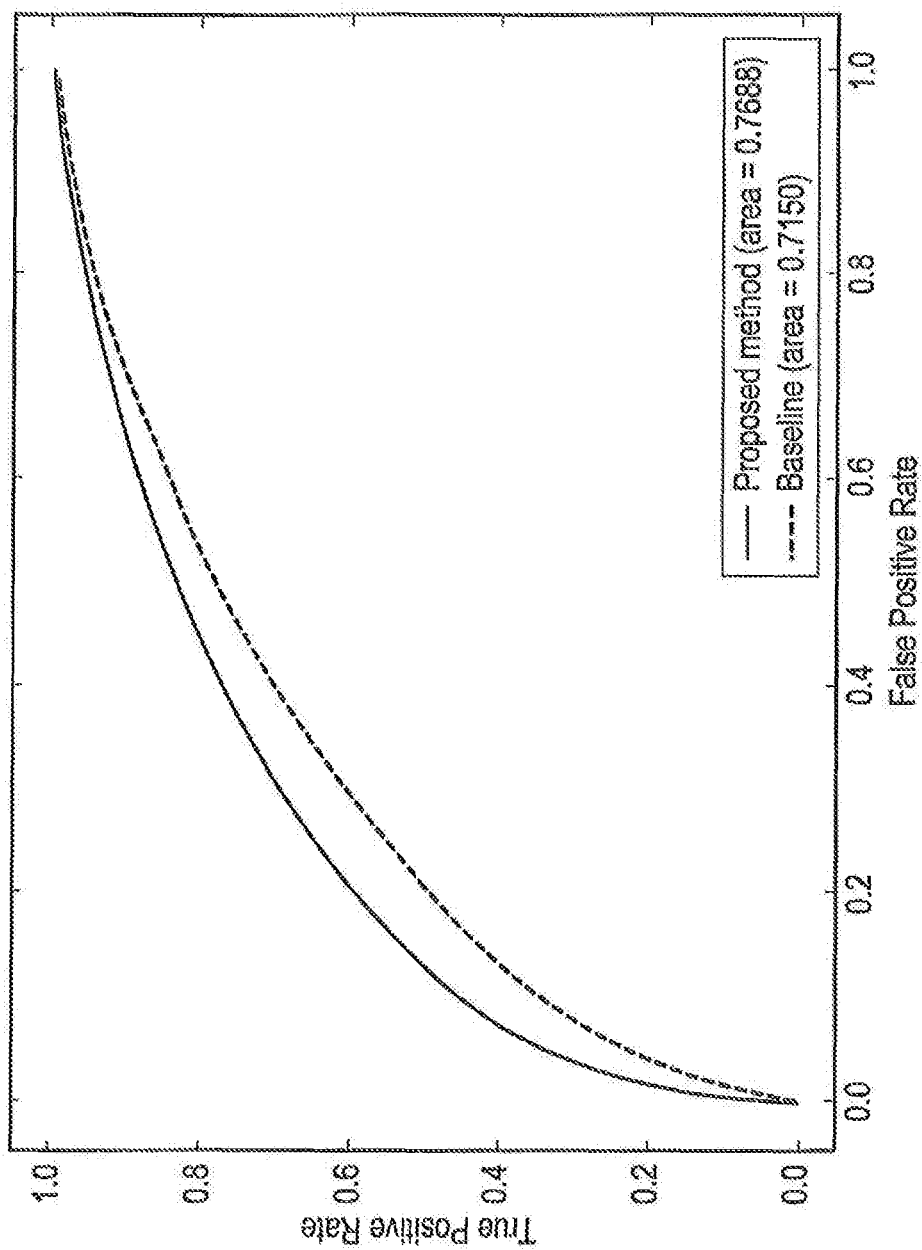
FIG. 9 compares ROC of the present application with Sun according to an embodiment of the present application.

FIG. 9 compares the resulting ROC curves for Sun's approach (the dash line labeled as "Baseline" in FIG. 9) and the proposed method (the solid line in FIG. 9). The proposed method has an ROC curve that is consistently above the Sun's approach. This will lead to a greater AUC value of the proposed method than the Sun's approach. The results show that introducing new domain-based features and using data-driven feature selection leads to a significant improvement over Sun when the analysis is based on low frequency GPS tracks (a ROC AUC of 0.769 compared to a baseline of 0.715).

It is important to stress that domain-based features alone, though highly ranked, could not be able to provide a good classification performance: a simple experiment using only road type and total travelled distance yields an AUCs of 0.65, far below what we obtain when the optimal 69 features are considered.

The results shown so far involve only vehicle classification from a single observed track. At the meantime, several tracks are actually available for each vehicle in our dataset. It is thus natural to assess the effectiveness of performing vehicle classification based on the full set of GPS data for each vehicle, rather than on a single track. As a first step, every track in the dataset is classified by using the single-track SVMs, yielding a discrete label and the continuous, signed value of the decision function for the single-track. Then, the average of the values of the single-track decision functions was obtained from all GPS tracks of the vehicle. The results reported in FIG. 10 show that the aggregation of multiple tracks for a vehicle leads to a consistent increase in classification performance (0.89 AUC).

Figure 10:
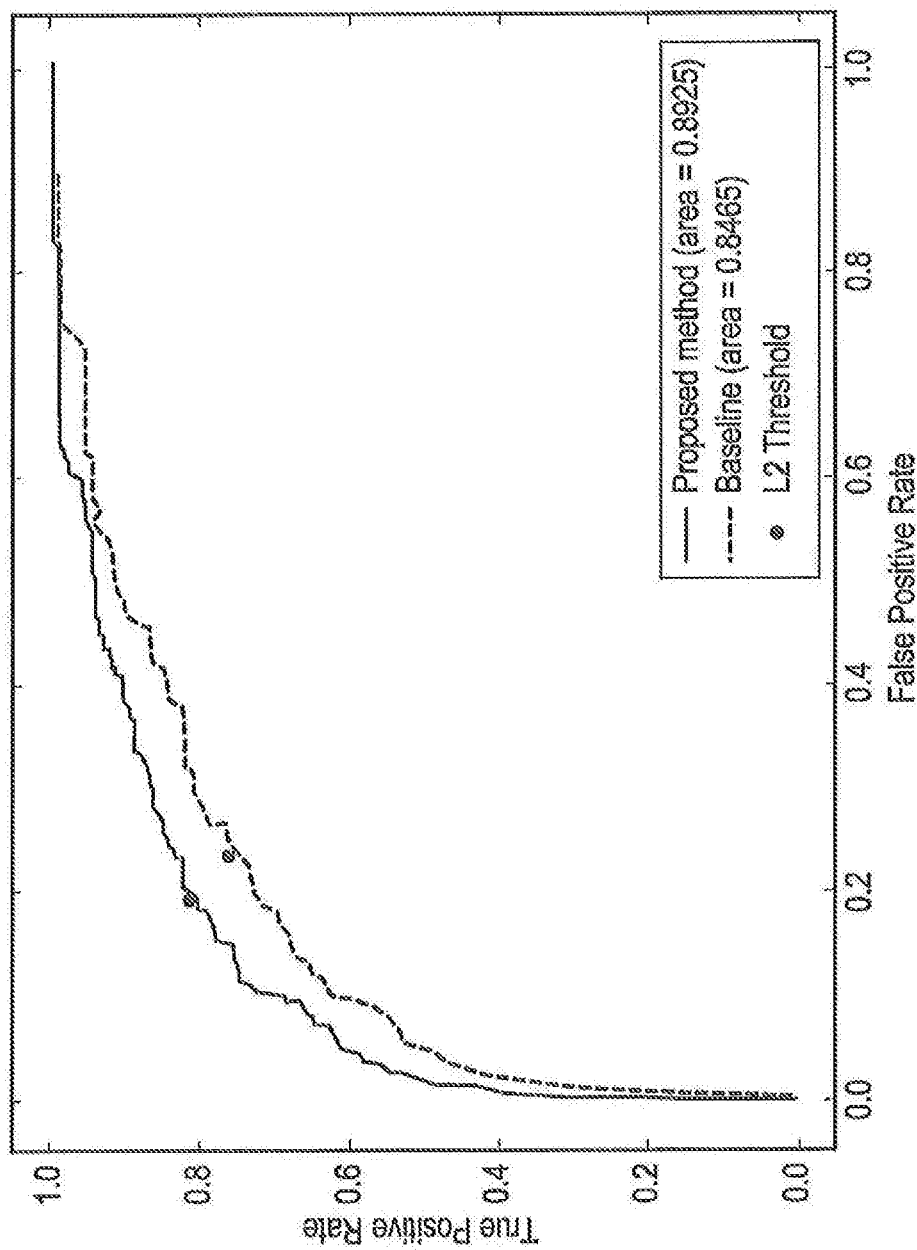
FIG. 10 illustrates ROCs obtained by using a plurality of GPS tracks according to an embodiment of the present application.

Finally, in order to analyze the classification performance in more detail, let us consider the cutoff threshold of the ROC curve yielding the smallest distance from the optimal classifier, i.e., the closest point in from to the top-left corner in FIG. 10, for both the baseline and our proposed method. Using such values we obtain the confusion matrix in the following Table 7, where we show the classification performance with respect to each of the lower-level vehicle types. As it can be seen, both classifiers perform very well at the extrema of the spectrum, i.e. on small vehicles (CAR and SUV) and on big vehicles (TRUCK and BIGTRUCK), while performance is worse when trying to classify PICKUP from SMALLTRUCK. This is likely due to the intrinsic ambiguity in the definition of these classes, as discussed in previous parts of this application. Interestingly enough, the baseline method has better results than our method on 2 out of 7 vehicle types, CAR and SMALLTRUCK, which more closely match the two types of vehicles used in Sun.

TABLE 7

CONFUSION MATRIX ON THE MULTIPLE TRACKS PER VEHICLES RESULTS

|  | Baseline | | Proposed method | |
| --- | --- | --- | --- | --- |
|  | LIGHT-DUTY | HEAVY-DUTY | LIGHT-DUTY | HEAVY-DUTY |
| CAR | 0.923 | 0.077 | 0.808 | 0.192 |
| SUV | 0.783 | 0.217 | 0.870 | 0.130 |
| VAN | 0.788 | 0.212 | 0.859 | 0.141 |
| PICKUP | 0.723 | 0.277 | 0.741 | 0.259 |
| SMALLTRUCK | 0.435 | 0.565 | 0.449 | 0.551 |
| TRUCK | 0.205 | 0.795 | 0.096 | 0.904 |
| BIGTRUCK | 0.053 | 0.947 | 0.000 | 1.000 |

The experimental results show that the feature selection procedure extracts a set of highly predictive features, letting our method outperform the baseline in terms of area under the ROC curve. The optimal set of features is quite large (69 features) and heterogeneous, but several high level considerations can be drawn. First, total driven distance and road types are within the top 10 features, thus confirming our intuition on their potential value for vehicle classification. Second, some features related to speed are also ranked very high: these can be expected to be more important in a low frequency scenario than acceleration-based ones, but we also speculate that their importance is amplified by exploiting them in conjunction with road types, as our experimental results suggest. Third, some acceleration-related features, albeit less important in the low-frequency scenario, still contribute to classification performance and are worth being included in the set of discriminative features.

The system and method of the present application uses features based on travelled distance, speed and acceleration, aggregated over each GPS track with several functions. It also exploits the type of travelled roads using a reverse geocoding service. The highly relevant set of features is selected automatically, via a Recursive Feature Elimination algorithm in a cross-validation framework, where classification is performed via SVM with an RBF kernel. Furthermore, the classification of several tracks from the same vehicle may be effectively aggregated, by performing a weighted average over the output of the SVM classifier. Experimental results show that this procedure is able to boost classification performance.

The phrase "an embodiment" as used herein does not necessarily refer to the same embodiment, though it may. In addition, the meaning of "a," "an," and "the" comprise plural references; thus, for example, "an embodiment" is not limited to a single embodiment but refers to one or more embodiments. As used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. It is noted that in this disclosure and particularly in the claims and/or paragraphs, terms such as "comprises", "comprised", "comprising" and the like can have the meaning attributed to it in U.S. Patent law; e.g., they can mean "includes", "included", "including", and the like.

While this invention has been described in conjunction with the specific embodiments outlined above, it is evident that many alternatives, modifications, and variations will be apparent to those ordinarily skilled in the art. Accordingly, the preferred embodiments of the invention as set forth above are intended to be illustrative, not limiting. Various changes may be made without departing from the spirit and scope of the inventions as defined in the following claims.

What is claimed is:

1. A method for classifying a vehicle, the method comprising:
retrieving a low frequency GPS track having a sampling interval of at least 20 seconds;
deriving additional data from the low frequency GPS track, the derived additional data including interval speed and instantaneous acceleration of the vehicle;
extracting a plurality of data sets from the low frequency GPS track and the additional data;
generating a plurality of features associated with the low frequency GPS track from the plurality of extracted data sets;
establishing a kernel using an area under a curve (AUC) of a Receiver Operating Characteristics Curve (ROC);
selecting an optimal feature set for classifying the vehicle to train a machine learning model for use by a classifier, selecting the optimal feature set by:
iteratively removing a feature below a threshold level of a vehicle classification performance from the plurality of generated features associated with the low frequency GPS track and a plurality of empirical features to create a feature set, and
iteratively decreasing the feature set by a predetermined amount at each iteration by discarding one or more features whose removal yields AUCs below an AUC threshold level associated with classifying results from the low frequency GPS track; and providing the optimal feature set and the kernel to the classifier, using the machine learning model, to classify the vehicle into a predetermined class of vehicles based on the low frequency GPS track.

2. The method of claim 1, wherein the additional data further include interval acceleration of the vehicle.

3. The method of claim 1, wherein the plurality of extracted data sets include a sequence of interval speed, a sequence of instantaneous acceleration, and a sequence of interval acceleration.

4. The method of claim 1, wherein generating the plurality of features associated with the low frequency GPS track includes aggregating the plurality of extracted data sets by statistical functions.

5. The method of claim 1, further comprising:
providing the plurality of empirical features to the classifier prior to selecting the optimal feature set.

6. The method of claim 5, wherein the plurality of empirical features include a total distance of the low frequency GPS track and road types of routes covered by the low frequency GPS track.

7. The method of claim 1, wherein the classifier includes a support vector machine having the kernel,
the kernel being a radial basis function kernel.

8. The method of claim 7, further comprising:
collecting a plurality of training samples that have low frequency GPS tracks of vehicles with a known class; and
determining operating parameters of the support vector machine with the radial basis function kernel based on the plurality of training samples.

9. A non-transitory storage medium storing instructions, the instructions comprising:
one or more instructions which, when executed by a processor of a device, cause the processor to:
retrieve a low frequency GPS track having a sampling interval of at least 20 seconds;
derive additional data from the low frequency GPS track, the derived additional data including interval speed and instantaneous acceleration of a vehicle;
extract a plurality of data sets from the low frequency GPS track and the additional data;
generate a plurality of features associated with the low frequency GPS track from the plurality of extracted data sets;
establish a kernel using an area under a curve (AUC) of a Receive Operating Characteristics Curve (ROC);
select an optimal feature set for classifying the vehicle to train a machine learning model for use by a classifier,
select the optimal feature set, by:
iteratively removing a feature below a threshold level of a vehicle classification performance from the plurality of generated features associated with low frequency GPS track and a plurality of empirical features to create a feature set,
and
iteratively decreasing the feature set by a predetermined percent at each iteration by discarding one or more features whose removal yields atoll AUCs below an AUC threshold level associated with classifying results from the low frequency GPS track; and
provide the optimal feature set and the kernel to the classifier, using the machine learning model, to classify the vehicle into a predetermined class of vehicles based on the low frequency GPS track.

10. The non-transitory storage medium of claim 9, wherein the additional data further include interval acceleration of the vehicle.

11. The non-transitory storage medium of claim 9, wherein the plurality of extracted data sets include a sequence of interval speed, a sequence of instantaneous acceleration, and a sequence of interval acceleration.

12. The non-transitory storage medium of claim 9, wherein the one or more instructions, that cause the processor to generate the plurality of features associated with the low frequency GPS track, cause the processor to:
aggregate the plurality of extracted data sets by statistical functions.

13. The non-transitory storage medium of claim 9, wherein the instructions when executed by the processor, further cause the processor to:
provide the plurality of empirical features to the classifier prior to selecting the optimal feature set.

14. The non-transitory storage medium of claim 13, wherein the plurality of empirical features include a total distance of the low frequency GPS track and road types of routes covered by the low frequency GPS track.

15. The non-transitory storage medium of claim 9, wherein the classifier includes a support vector machine having the kernel,
the kernel being a radial basis function kernel.

16. The non-transitory storage medium of claim 15, wherein the instructions when executed by the processor, further cause the processor to:
collect a plurality of training samples that have low frequency GPS tracks of vehicles with a known class; and
determine operating parameters of the support vector machine with the radial basis function kernel based on the training samples.

17. The method of claim 1, wherein the plurality of empirical features are obtained from a third party vendor based on position information of the low frequency GPS track.

18. The method of claim 1, where generating the plurality of features comprises:
generating the plurality of features by applying one or more statistic functions to the plurality of extracted data sets.

19. The non-transitory storage medium of claim 13, wherein the plurality of empirical features are obtained from a third party vendor based on position information of the low frequency GPS track.

20. The non-transitory storage medium of claim 13, wherein the one or more instructions, that cause the processor to generate the plurality of features of the low frequency GPS track, cause the processor to:
generate the plurality of features of the low frequency GPS track by applying one or more statistic functions to the plurality of extracted data sets.

* * * * *